US008818839B2

(12) United States Patent
Leff et al.

(10) Patent No.: US 8,818,839 B2
(45) Date of Patent: Aug. 26, 2014

(54) ONLINE MARKETING, MONITORING AND CONTROL FOR MERCHANTS

(71) Applicant: Reach Pros, Inc., Westlake Village, CA (US)

(72) Inventors: Adam Leff, Newbury Park, CA (US); David Bay, Oak Park, CA (US); Phil Dawley, Thousand Oaks, CA (US); Mike Ferro, Westlake Village, CA (US)

(73) Assignee: Reach Pros, Inc., Westlake Village, CA (US)

( * ) Notice: Subject to any disclaimer, the term of this patent is extended or adjusted under 35 U.S.C. 154(b) by 0 days.

(21) Appl. No.: 13/645,360

(22) Filed: Oct. 4, 2012

(65) Prior Publication Data

US 2013/0085804 A1    Apr. 4, 2013

Related U.S. Application Data

(60) Provisional application No. 61/543,163, filed on Oct. 4, 2011.

(51) Int. Cl.
*G06Q 30/02* (2012.01)

(52) U.S. Cl.
CPC ................................. *G06Q 30/0219* (2013.01)
USPC ........................................................ 705/7.29

(58) Field of Classification Search
CPC ................................................... G06Q 10/00
USPC ........................................................ 705/7.29
See application file for complete search history.

(56) References Cited

U.S. PATENT DOCUMENTS

| | | | |
|---|---|---|---|
| 5,380,991 A | 1/1995 | Valencia et al. | |
| 5,644,723 A | 7/1997 | Deaton et al. | |
| 5,710,886 A | 1/1998 | Christensen et al. | |
| 6,035,280 A | 3/2000 | Christensen | |
| 6,321,208 B1 | 11/2001 | Barnett et al. | |
| 6,336,099 B1 | 1/2002 | Barnett et al. | |
| 6,915,271 B1 | 7/2005 | Meyer et al. | |
| 7,447,646 B1 | 11/2008 | Agarwal et al. | |
| 7,516,103 B1 * | 4/2009 | Peitrucha et al. | 705/56 |
| 2005/0043995 A1 | 2/2005 | Nguyen | |
| 2005/0209921 A1 | 9/2005 | Roberts et al. | |
| 2006/0184381 A1 * | 8/2006 | Rice et al. | 705/1 |
| 2007/0283287 A1 | 12/2007 | Taylor et al. | |
| 2008/0140520 A1 | 6/2008 | Hyder et al. | |
| 2008/0270231 A1 | 10/2008 | Li et al. | |
| 2009/0043645 A1 | 2/2009 | Barnett et al. | |
| 2009/0192854 A1 * | 7/2009 | Pietrucha et al. | 705/7 |
| 2009/0271270 A1 | 10/2009 | Regmi et al. | |
| 2012/0016764 A1 * | 1/2012 | Ouimet | 705/26.7 |
| 2012/0209673 A1 * | 8/2012 | Park | 705/14.15 |

* cited by examiner

*Primary Examiner* — Romain Jeanty

(74) *Attorney, Agent, or Firm* — Knobbe, Martens, Olson & Bear, LLP

(57) ABSTRACT

Systems and methods of online marketing, monitoring and control for merchants are disclosed. Third party providers are crawled to obtain information about a plurality of merchants and correlate the merchant information to create a merchant database. Third party providers are monitored for merchant information, and information about the merchants is stored. Alerts are provided to subscribing merchants when an alert trigger is identified within the system or at a third party provider. The method allows the subscribing merchant to view and respond to reviews, view and maintain online listings, prepare and send consumer offers, and prepare and send communications to consumers, all directly from the system. The method allows the subscribing merchant to view information and analysis for competing merchants. An overall marketing score for merchants is prepared and displayed. The method may be performed on a server and accessed via an Internet browser and mobile device applications.

58 Claims, 14 Drawing Sheets

ONLINE MARKETING, MONITORING AND CONTROL FOR MERCHANTS

RELATED APPLICATION INFORMATION

This patent claims priority from provisional patent application No. 61/543,163 filed Oct. 4, 2011, the entire contents of which are incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to marketing, online marketing, marketing success evaluation, online information management and monitoring, marketing research, competitive information, customer communications and merchant rating and review monitoring.

2. Description of the Related Art

Merchants of all kinds have been marketing themselves— their products, services and offerings—for many years. Newspaper ads, yellow pages ads, coupons and billboards are just a few of the ways merchants have promoted themselves. With the advent of the Internet, the World Wide Web and the ability for consumers to access, consume and even contribute information to a large audience, new avenues for marketing were born. Specialized rating and review websites were born, such as YELP, TRIPADVISOR.COM and OPENTABLE.COM. And traditional directories were born anew as YP.COM and YELLOW PAGES.COM. These are only just a few of the national reaching websites. Local review websites are also popular. Newspapers and magazines also provide a forum for consumer comments. The number of places online where merchants are listed is large. When the number of rating and review websites is added to this, the number of location online where a merchant is mentioned in some way is very large. Based on the number of online references to a merchant, it is difficult for a merchant to manage and maintain accurate information about the business—such as, for example, hours of operation, payment types accepted—on the large number of directory and listing websites. Moreover, it is difficult for merchants to monitor and respond to ratings and review provided on the large number of rating and review websites.

THE DRAWINGS

DETAILED DESCRIPTION

Described herein is a system used by merchants to monitor and control their online presence and improve their online and other marketing. The system may operate as a website that allows merchants to view and monitor how information, rating and reviews about the merchant appear on third party websites and services as well as on their own website. The system allows for consumer contact management and tracking as well as directed marketing to consumers. The system allows a merchant to compare marketing information, scores and analytics with competing merchants. The system provided competitor comparison allows merchants to see how they are performing relative to their competitors. The system provided competitor comparison allows merchants to use the system to make better informed marketing decisions. The system guides merchants through the online presence and marketing space with a recommendation engine that provides step by step instructions based on system collected data on the merchant and the merchant's competitors. The system provides a series of customized recommendations based on the information about the merchant and optionally the merchant's competitors from multiple third party websites, social media providers and other online information the system collects and analyzes. In addition, the system provides recommended marketing plans and the ability to create and implement merchant customized marketing. Further, the system provides a single online location where a merchant can view, modify and manage key information across a plurality of third party websites, social media providers and other online locations.

As used herein the term merchant means an owner or proprietor of a consumer facing business or a business to business provider of good and/or services, including service providers and sellers of goods such as, for example, restaurants, rug cleaners, dry cleaners, hardware stores, hair cutting and styling salons, spa service providers, cosmetologists, dog groomers, furniture stores, office supply stores, video game stores, dieticians, dentists, lawyers, and many others. As used herein the term consumer includes both customers and prospective customers or prospects. A customer is a person or company that has made a purchase of a good or service from a merchant.

Environment

Figure 1:
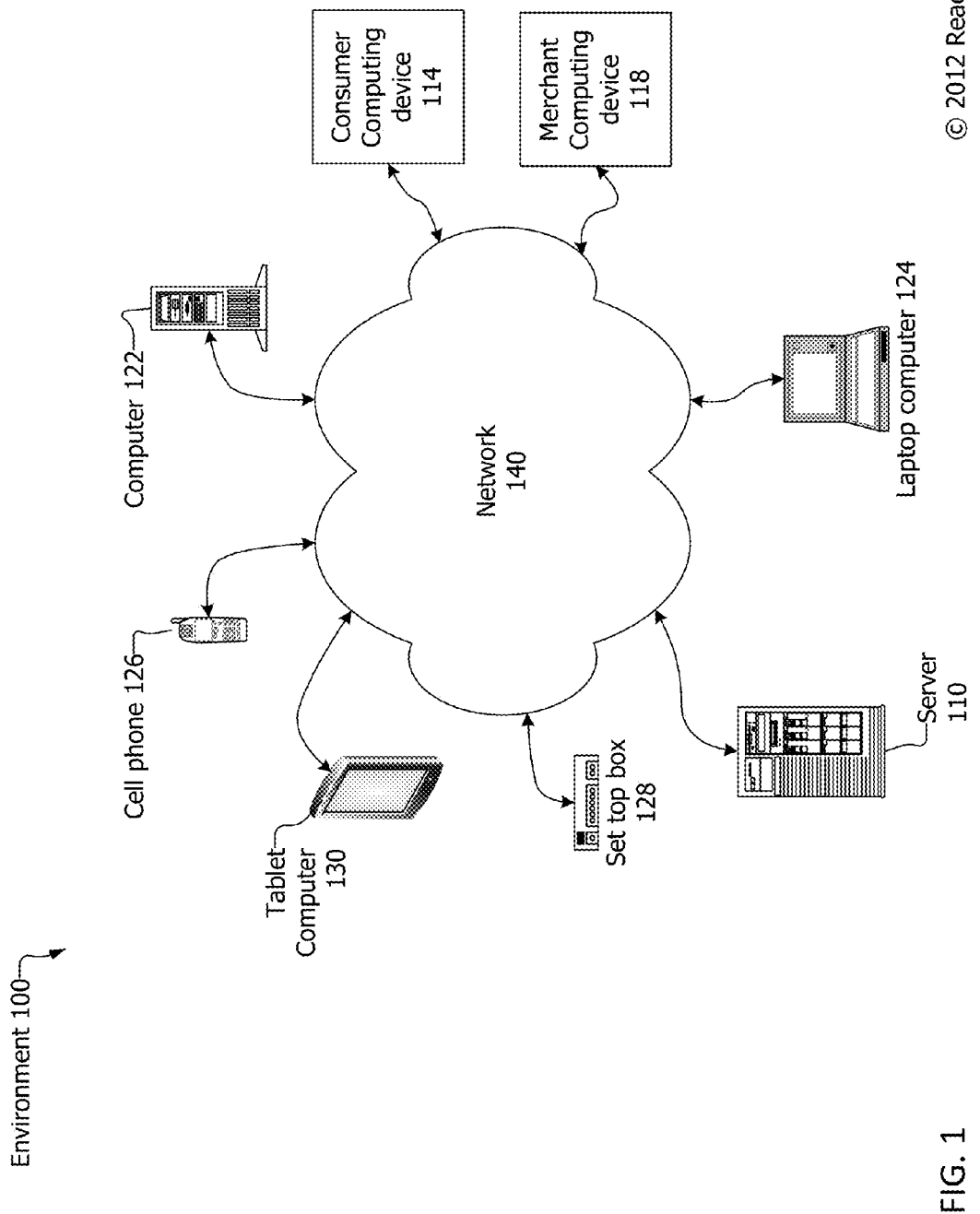
FIG. 1 is a block diagram of an environment in which the system described herein may be implemented.

FIG. 1 is a block diagram of an environment in which the system described herein may be implemented. The systems described herein may be implemented as software on one or more servers 110 that are accessed over a network 140 by merchants via merchant computing devices 118. Merchants may use an Internet browser or other application (including a cellular telephone or mobile device app or application), widget, gadget or applet operating on a computing device shown in environment 100 to access the services provided by the servers 110 according to the systems and methods described herein. Consumers and merchants may use an Internet browser or other application (including a cellular telephone application), widget, gadget or applet operating on a computing device shown in environment 100 to access the services of third party providers via consumer computing devices 114 and merchant computing devices 118. As used herein, third party providers include third party websites, social media websites, apps and related online media destinations including retailer websites, review websites, shopping websites, directory websites, and others, for example, but not limited to, FACEBOOK, FOURSQUARE, GOOGLE+, YELP, OPENTABLE, SUPERPAGES, YELLOWPAGES.COM, TWITTER, AMAZON.COM, BUY.COM, FOURSQUARE, NEWEGG.COM, GOOGLE, ASK.COM, PINTEREST, PATCH.COM, ANGIESLIST.COM, GROUPON.COM, YAHOO.COM, CITYSEARCH.COM, EPINIONS.COM, and others.

The network 140 may be wired or wireless or a combination of both. The network 140 may be circuit-switched or packet-switched or a combination of both. The network 140 may be or include the Internet.

The software on the server 110 may be in the form of one of or one or more of each of firmware, application programs, applets (e.g., a Java applet), browser plug-ins, COM objects, dynamic linked libraries (DLLs), scripts, subroutines, operating system components or services, databases and others. The databases used and described herein may be or employ relational, object based, hierarchical, JAVA database connectivity (JDBC), SQL, XML, and other techniques and constructs. The software and its functions may be distributed such that some actions are performed by a first server and others by other servers. The server may run an operating system, including, for example, variations of the Linux, Unix and Microsoft Windows operating systems. The software on the server 110 may communicate with and access information stored on online media provider servers over network 140.

The software may be stored in electronic, machine readable storage media or devices which may be referred to as storage media and storage devices. Storage media and devices include, for example, magnetic media such as hard disks, floppy disks and tape; optical media such as compact disks (CD-ROM and CD-RW), digital versatile disks (DVD and DVD±RW), and BLU-RAY discs (BD-ROM); flash memory cards, silicon storage devices including solid-state drive (SSDs) and other silicon based storage media; hard disk drives, DVD drives, flash memory devices, and others.

Computing devices such as the consumer computing devices 114 and the merchant computing devices 118 may be and include personal computers 122, notebook computers, laptop computers 124, cellular telephones 126, personal digital assistants (PDAs), computing tablets 130, set top boxes 128, video game systems, point of sale terminals, personal video recorders, personal media players, and other devices capable of network communications and running an Internet browser. Internet browsers include for example, versions of Microsoft Internet Explorer, Mozilla Firefox, Google Chrome, Apple Safari, and Opera. The computing devices may run an operating system, including, for example, variations of the Linux, MICROSOFT WINDOWS, SYMBIAN, CHROME, ANDROID, and APPLE iOS operating systems. Consumer and merchant computing devices may also include an email program or client such as, for example, MICROSOFT OUTLOOK and Thunderbird. Consumer and merchant computing devices may also include a text messaging program, client, widget, gadget or applet including a short message service (SMS) program, YAHOO Messenger, etc. Merchants may use an Internet browser or other application including a cellular telephone or mobile device application, widget, gadget or applet operating on a computing device to access the services provided by the system described herein. Merchants and consumers may use an Internet browser or other application including a cellular telephone or mobile device application, widget, gadget or applet operating on a computing device to access the services provided by third party websites (e.g., FACEBOOK, YELP, PINTEREST, GOOGLE+ and others) and social media providers (e.g., FACEBOOK, TWITTER, PINTEREST, FOURSQUARE and others).

The merchant's computing devices may be accessed from the merchant's place of business, home or office, and may be portable and accessed while the merchant is travelling or at a location other than a home or office, or other location.

Creating and Maintaining a Merchant Database

Figure 2:
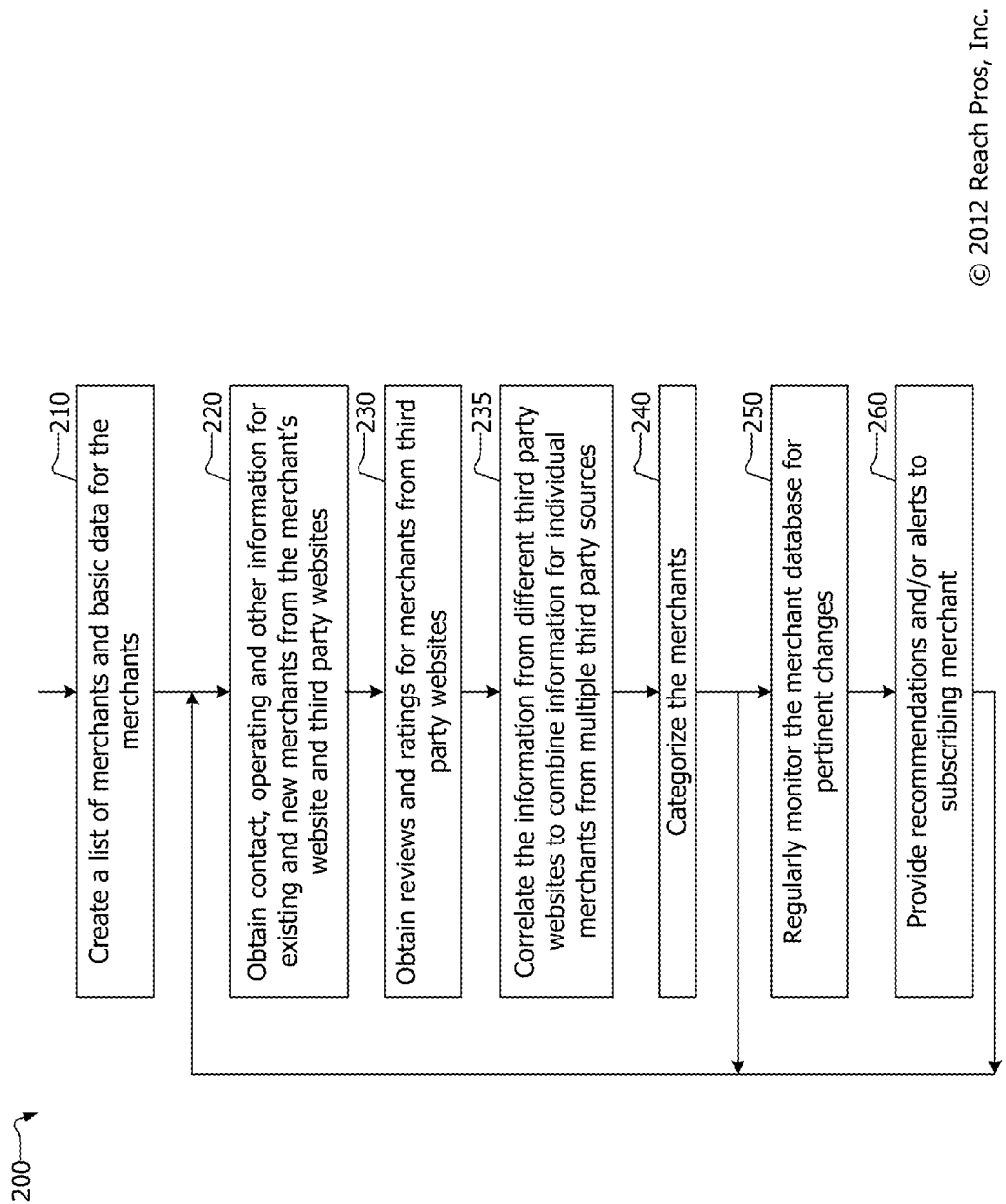
FIG. 2 is a flowchart showing the actions taken to create and maintain a database of merchant information.

For the system to provide the features described herein, certain preliminary steps may be taken by the system. The system may first create a database of merchant information. The database may contain merchant records including basic and enhanced data for the merchants. FIG. 2 is a flowchart showing the actions taken to create and maintain a database of merchant information, as shown in block 200. Initially, the system may create a list of merchants including the name, address and phone number for the merchant, as shown in block 210. This may be referred to as basic data. The system may obtain the basic data by searching top search engines and directory websites via the internet using a proprietary list of categories in conjunction with specific geographies. The system performs this process regularly, and an ongoing manner. The process identifies an initial list of merchants and on a regular, ongoing basis identifies new merchants as new merchants start businesses. The system may augment the list of merchants by acquiring a listing of merchants from a well-known source of this information. The information may be obtained in computer readable form, such as a spreadsheet or CSV file and from third party websites.

The system may then obtain additional contact information, operating information and other information for the merchants including obtaining information from the merchant's website and third party websites, as shown in block 220. This may be referred to as enhanced data. When the system loops, through this method, the system may also identify new merchants to be added to the merchant database, and obtain their basic data and their enhanced data. The contact information included in the enhanced data may include email addresses, social media account name (e.g., TWITTER account name), additional phone numbers, and other ways for a consumer to communicate with the merchants. The enhanced data may include the prices or price ranges for good and services. The enhanced data may include information about whether there are photos or videos posted by or about the merchant, including links to the photos and videos. The enhanced data may include payment types accepted. The enhanced data may include direct links to the merchant's information on third party websites as well as links (i.e., URLs) to merchant information on third party websites. The enhanced data may include meta data related to the merchant's listings on third party websites. The system may store the basic data and enhanced data in the merchant database.

The enhanced data may be obtained by the system by smart crawling of Internet websites and online repositories. The system may automatically and intelligently crawl well known directory and merchant listing websites and webpages to obtain merchant contact and operating information, the basic data and enhanced data. The enhanced data may include numbers of followers of the merchant on third party websites and social media providers, reviews and ratings for the merchants as well as meta data on the reviews, ratings and reviewers, such as reviewer images, information available on the reviewer such as number of reviews written, number of followers of the reviewer, etc. The system may obtain reviews and ratings for the merchants from third party websites, as shown in block 230. The system may automatically and intelligently crawl well known social networking website, review and rating websites and webpages to obtain reviews and ratings for the merchant as well as obtain links to or the actual photos and videos of the merchant or involving the merchant's products and services. The system may automatically and intelligently crawl well known photos and video sharing websites and webpages to obtain links to or the actual photos and videos of the merchant or involving the merchant's location, products and services.

After the information is collected for merchants where it is available, the system uses various processes to correlate the information from the different third party websites to combine information for individual merchants from multiple third party sources, such a third party websites and social media providers, as shown in block 235. Data or listing information collected on one website may be correlated as being for the same business as data or listing information from another website by matching a permutation of phone numbers, addresses, names, latitude and longitudes, and homophone and soundex matches of business names.

Based on the information already obtained by the system, the system may categorize the merchants, as shown in block 240. Depending on the embodiment, the category or categories may be included in one or both of the basic data and the enhanced data. The categorization may follow various rules and use contextual and other intelligence to arrive at one or more appropriate categories for the merchant. The system may intelligently determine that each merchant should be in multiple categories. The assigning of multiple categories to a merchant allows the system to better identify merchants that are competitors. The assigning of multiple categories to a merchant allows the system to recommend additional categories for merchants to use in describing themselves on third party websites and other online locations. By recommending that merchants increase the number of categories they use to designate and describe themselves online, the system increases the merchant's ability to be found in search results and otherwise located by customers and prospects.

For example, consider a restaurant that is open for lunch and dinner that serves pizza, Italian food entrees, sandwiches and salads. This restaurant could be categorized in the categories of pizza, Italian food, lunch restaurant based on information obtained in the various information gather about the merchant from rating, review, directory and listing websites. The system may look at other merchants that have pizza as a category and see what other categories they are listed under at multiple third party websites. Since pizza is a common category, the system may provide a recommendation to the merchant to add other categories that the other pizza category merchants are using, such as delivery, take-out, etc, which are other appropriate categories. The system supports the merchant's ability to manually add categories from a system provided list when the merchant determines that one or more additional categories are appropriate for their business. The system also captures names of categories supported by third party search engines, directory websites and other listing websites for the merchant. Based on this acquired category information, the system recommends the most advantageous categories that may be used for each third party website. For example, one website may use pizza, another may use pizzeria and another may not use pizza at all and only support Italian.

The system may have an automated mapping or correspondence engine or rules that automatically take one website's category and map it to a category used by the system that is different or achieves a different purpose. Much of the method to create a merchant database may be repeated to maintain and update the information in the database to keep it current and timely, and also to monitor and update for changes or activities of interest to a merchant, described below. The merchant database me be updated regularly by looping through the actions recited in blocks 220, 230 and 240, such as, for example, daily. The system may regularly monitor the merchant database for pertinent changes, as shown in block 250. In various embodiments, the system may daily, weekly, monthly, quarterly, etc. monitor the merchant database for: [a] changes, inconsistencies, corruptions, mistakes and the like in the merchant's information; [b] new ratings or reviews or changes or responses for ratings or reviews regarding the merchant or the merchant's competitors; [c] new competitors; [d] new information like new offers or communications, check-ins, likes, etc. for the merchant or its competitors; and [e] new listings found for the merchant. Based on this monitoring of the merchant database, the system may provide recommendations to the merchant and/or alerts to the merchant with recommendations about actions that should be taken in response to the monitoring, as shown in block 260. How frequently the system monitors information for and relevant to the merchant may be based on a merchant subscription to the system or may be a system default time period. For example, the system may allow merchant so subscribe to regularly monitoring and alerts on a daily, weekly, monthly, quarterly and yearly basis. Even when the merchant subscribes to alerts less frequently than daily, the system may regularly or daily update the merchant data for information about the merchant and competing merchants regardless of the monitoring and alert subscription purchased by a subscribing merchant. In this way, the system maintains a current and timely database including historical records of subscribing and on-subscribing merchants. The stored historical data may be used by the system to provide historical trend analysis a new or existing merchant as well as competitor comparison historical trend analysis for the subscribing merchant.

System Overview

Figure 3:
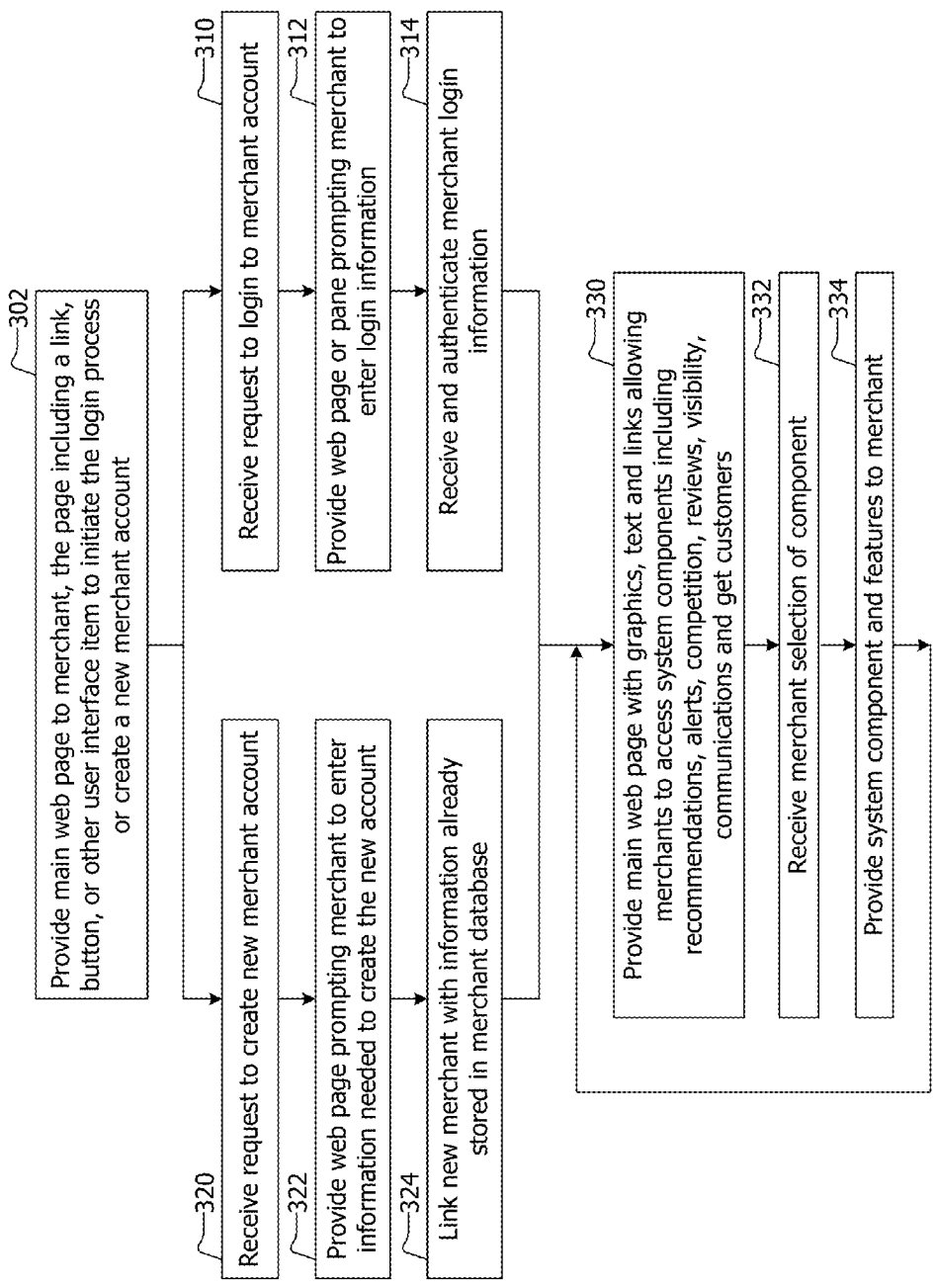
FIG. 3 is a flowchart showing an overview of the actions taken in using the system

The system may be provided at a website. FIG. 3 is a flowchart showing an overview of the actions taken in using the system. When a merchant traverses the website, the system provides a main web page to the merchant, as shown in block 302. The main web page includes a link, button, or other user interface item to initiate the login process, as shown in block 302. The system receives a merchant request to login to the merchant's account, as shown in block 310. The system provides a web page or pane prompting merchant to enter login information, as shown in block 312. In another embodiment, the login information may be entered directly on the main web page and/or retrieved from a cookie or other storage location or system. The system receives and authenticates the merchant's login information, as shown in block 314.

If the merchant does not yet have an account, the main web page includes a link, button, or other user interface item to create a new merchant account, as shown in block 302. The system receives a merchant request to create a new merchant's account, as shown in block 320. The system provides a web page prompting the merchant to enter information needed to create the new account, as shown in block 322. The system may require the name of the business along with an address, zip code and/or telephone number. The system may use this information to pull the earlier created merchant information from the merchant database. The system links the new merchant with merchant information stored in the earlier populated merchant database, as shown in block 322. The merchant database may have earlier been created and populated according to the method described above regarding FIG. 2. The system may ask the merchant to confirm the accuracy of various merchant information already included in the stored information for the merchant. The system may prompt the merchant to enter additional merchant information not already included in the stored information for the merchant, such as for example, TWITTER account name, whether free Wi-Fi is provided, hours of operation, payment types accepted, and others. The system may prompt the merchant to enter special merchant information, such as for example, if a restaurant if gluten-free or vegetarian offerings are available; if a dry cleaners if eco-friendly methods are used; if a restaurant is kosher, halal or vegan; if house visits or delivery are available; if a hair stylist whether specializing in thick hair; and others. The system may also later and/or regularly or occasionally prompt the merchant to provide additional and special information for inclusion in the merchant's record in the merchant database.

After the merchant account has been created or the merchant has logged in, the system provides a main web page with graphics, text and links allowing merchants to access system components including, for example, some or all of, recommendations, alerts, video instructions, competition, reviews, visibility, communications and get customers, as shown in block 330. The system receives a merchant selection of a component, as shown in block 332, and provides a web page, pane or otherwise provides access to that component and its features to the merchant, as shown in block 334. Although the components are described herein as recommendations, alerts, competition, reviews, visibility, communications and get customers, not all need be offered, and the constituent features within the components may be arranged differently in various implementations. Further, the components and/or features offered by the system as a web page may be made available to merchants via one or more mobile applications. In addition, the components and/or features offered by the system as a web page may be made available to merchants from other third party online and web-based systems via system integration using application interfaces (APIs) provided by the system.

A. The Main Web Page

Figure 4:
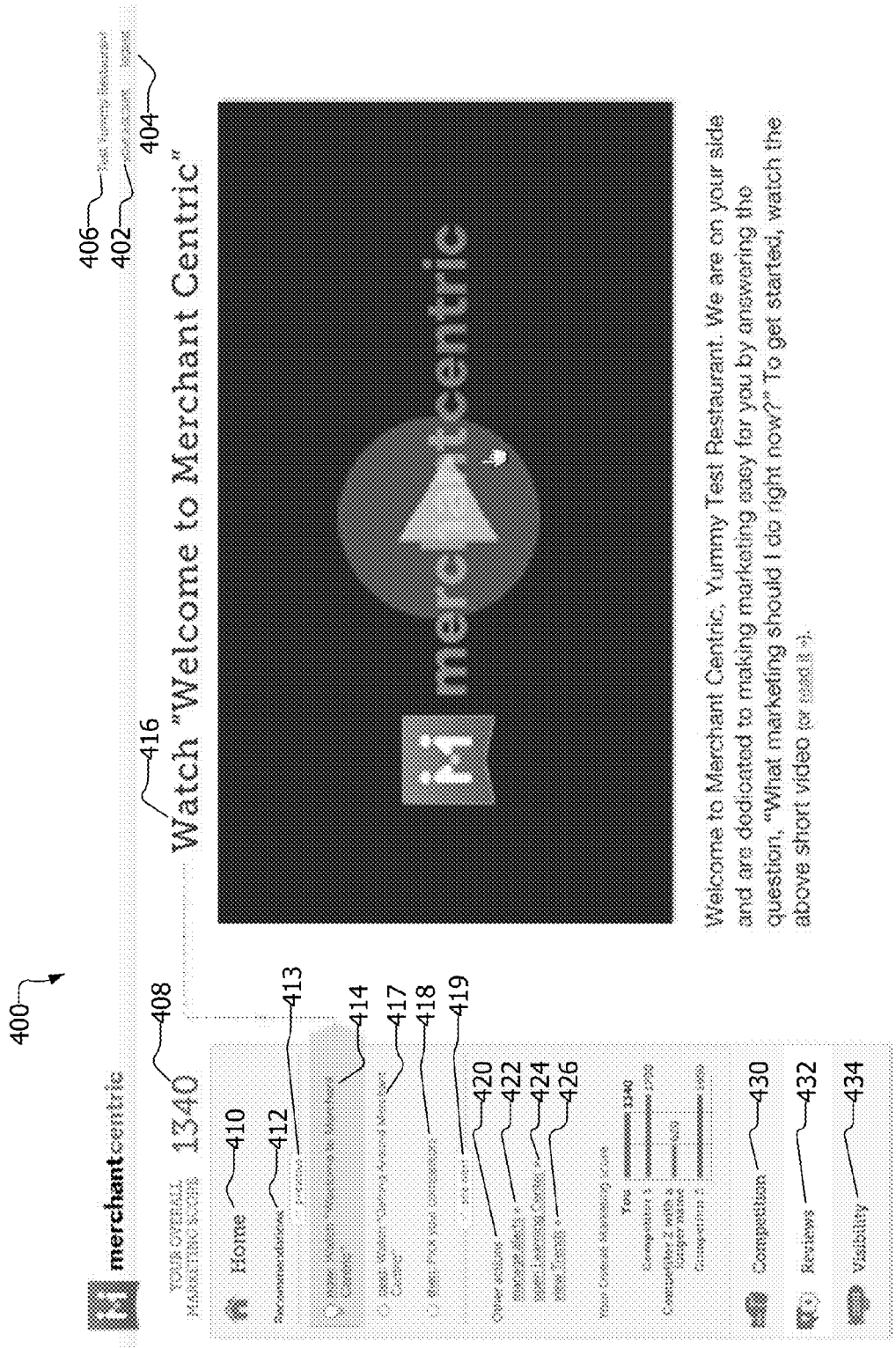
FIG. 4 is a screen shot of an example web main page.

FIG. 4 is a screen shot of an example web main page 400. The web page 400 may be the web page referenced in blocks 302 and 330 of FIG. 3. The web page 400 may include a text indicator 406 of the name of the subscribing merchant who has logged in and links to access account information 402 and to logout 404. If the merchant were not yet logged in, the portion of the web page 400 that includes links 402 and 404 may include links that state "create account" and "login". A merchant selecting "create account" or "login" corresponds to the actions recited in blocks 310 and 320, respectively, shown in FIG. 3 and causes the creation and logging in described flowing from blocks 310 and 320.

Figure 11:
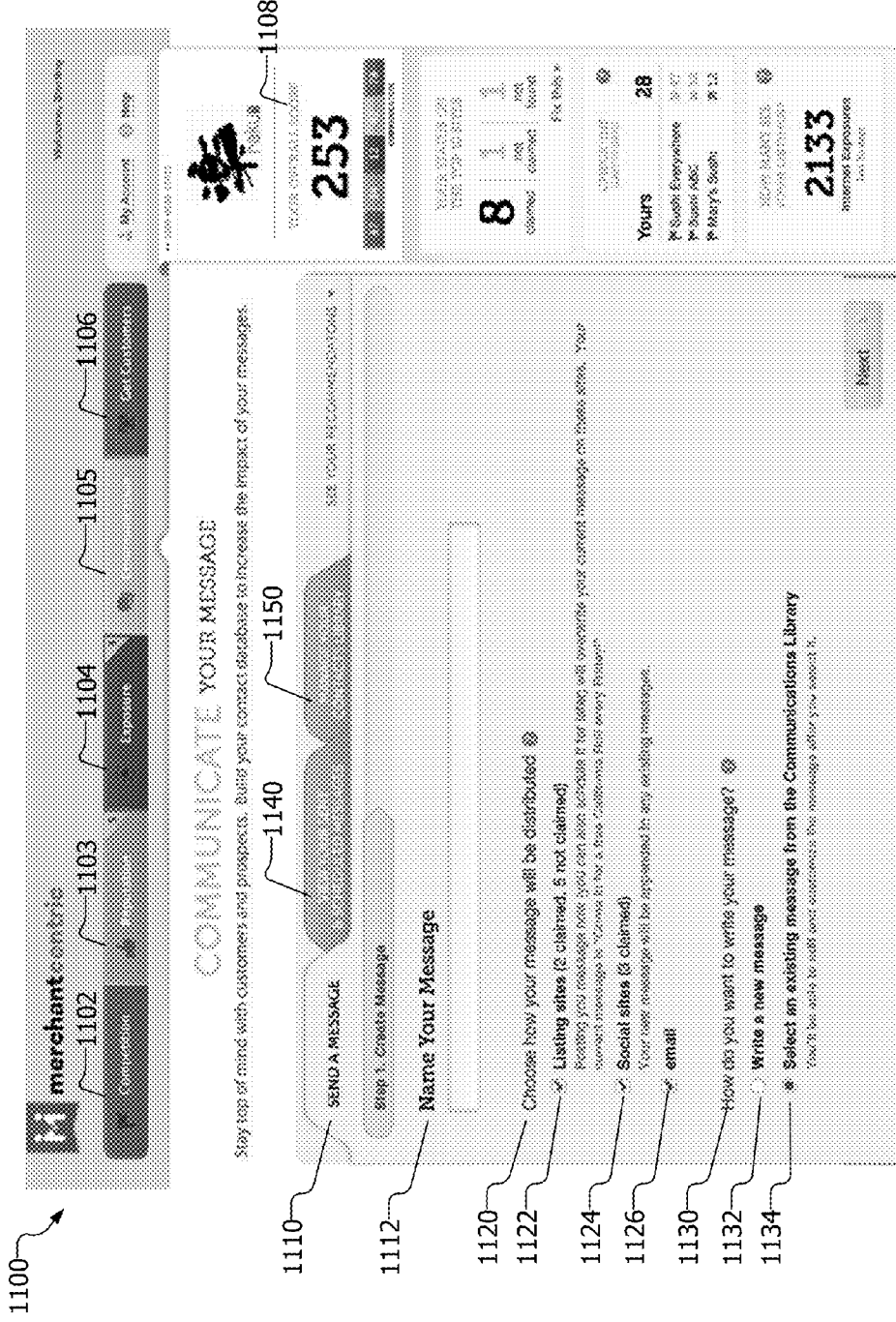
FIG. 11 is a screen shot of an example web page showing a communications management web page.

Returning to a FIG. 4, the main web page 400 provides the merchant access to the features of the system arranged as components. The system may group the features in any of a variety of ways. In one embodiment, the features are grouped in components and displayed vertically on the left hand side of the main page 400 as home 410, competition 430, reviews 432, visibility 434, communications (not shown) and get customers (not shown). Another embodiment of the system has the main components located in other places on the main page, such as, for example, in a horizontal row on the top of the page, as shown in FIG. 11. In this embodiment, the features are grouped in components and displayed horizontally across the top of the web page 1100 as competition 1102, reputation 1103, exposure 1104, communications 1105 and get customers 1106. Also displayed prominently in the main web page 400 and other web pages provided by the system is the subscribed merchant's overall marketing score 408 or overall score 1108, shown in FIGS. 4 and 11, respectively. The overall marketing score and other scores are described in detail below.

Figure 6:
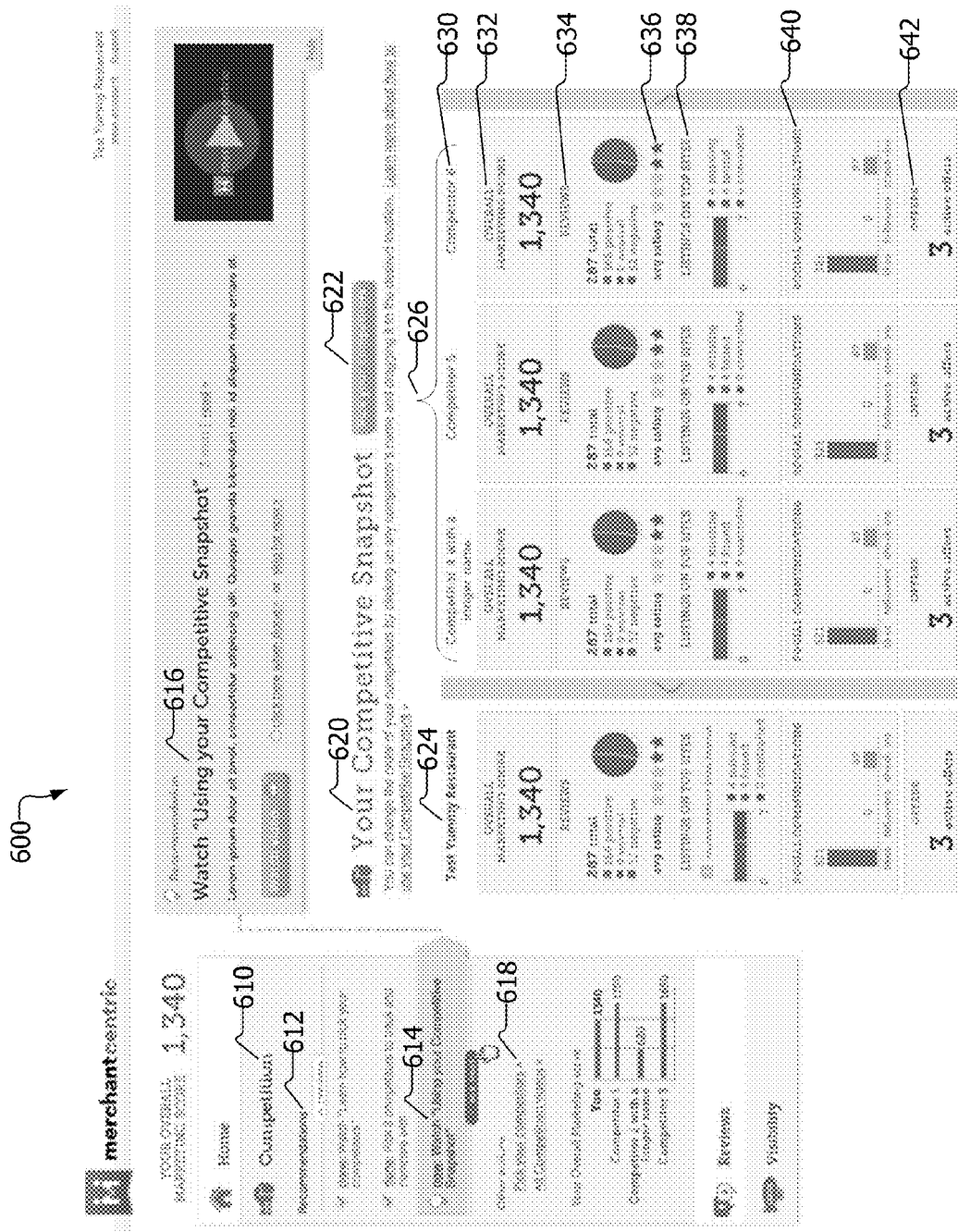
FIG. 6 is a screen shot of an example competitive snapshot web page.
Figure 7:
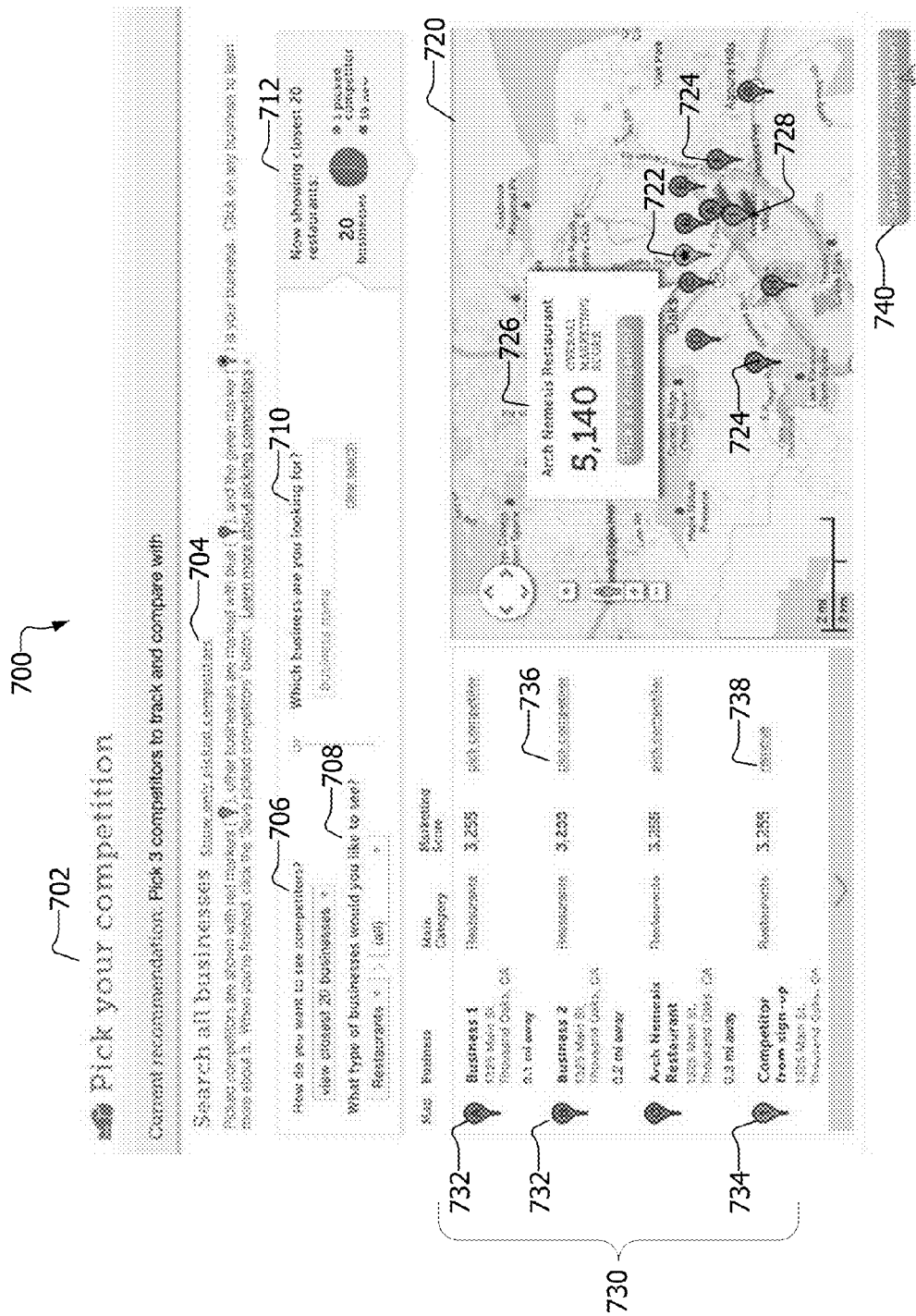
FIG. 7 is a screen shot of an example web page showing a competing merchant selection user interface.
Figure 8:
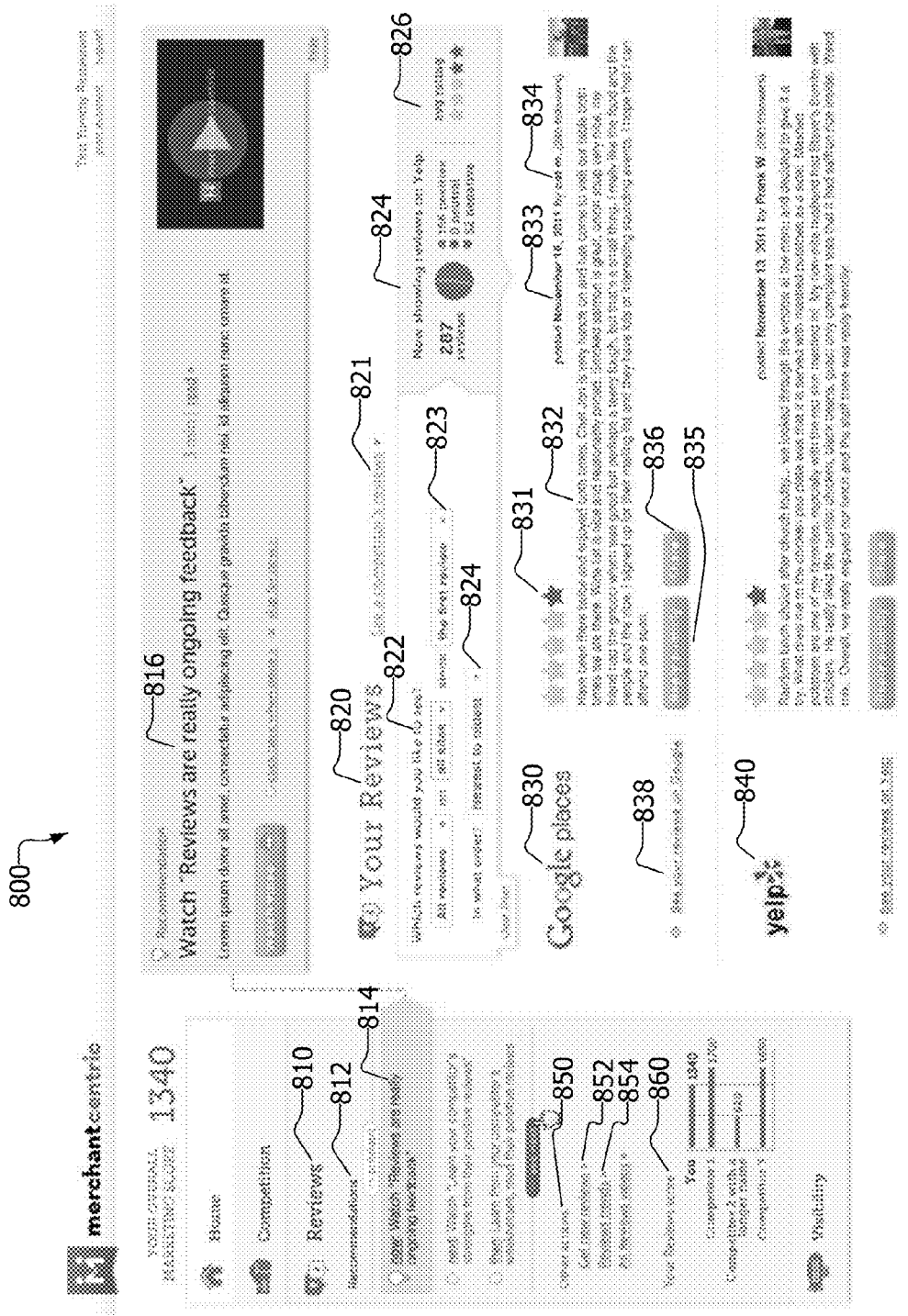
FIG. 8 is a screen shot of an example merchant's reviews web page.

In one embodiment, as shown in FIGS. 4, 6 and 8, recommendations are included within each component and are customized based on data stored for the merchant and its competitors. Recommendations 412 are actions the system recommends the merchant take regarding the home component 410. Referring to FIG. 6, recommendations 612 are actions the system recommends regarding the competition component 610. Referring to FIG. 8, recommendations 812 are actions the system recommends regarding the reviews component 810. In another embodiment, recommendations is a separate component that includes recommended actions from each of the other components based on data stored for the merchant and its competitors. The system provides recommendations to guide the merchant through a system generated online marketing plan that takes advantage of the offerings of third party websites and social media providers. The system may automate or semi-automate actions to be taken by the merchant when providing the recommendations, such as providing templates on the system that guide the merchant in replying to reviews to help improve reputation or providing a single clock ability allowing the merchant to claim a listing on a third party website to facilitate automated updates.

Returning to FIG. 4, the home component 410 may provide subscribing merchants the ability to watch instructional and educational videos about using the system and about marketing and presence on the Internet. In the example shown, the recommendations 412 under home 410 lists now, next and then recommended actions to be taken by a subscribing merchant. In this example, the now action is to watch a welcome video 414, the next action is to watch another video called getting around 417, and the then action to pick your competitors 418. When the merchant selects the now welcome video 414, the system displays title and information about the video 416 as well as a pane within which to watch the video. Although three recommendations 412 are provided under home 410, one, two or more recommendations may be listed. Although now, next and then actions are provided under recommendations 412, the listed recommended actions may have different or no labels, and may be ordered or arranged in other ways. Additional recommendations may be viewed by a merchant selecting the system provided preview 413 and next 419 graphical links. The recommendations shown and available to the merchant are based on data on the merchant in the merchant database, including actions taken by the merchant within the system. The recommendations are customized such that a merchant will not be shown recommendations to take actions already taken or pursue marketing plans not appropriate based on the data maintained by and scores computed by the system.

The system provides other action 420 in the home component 410 including the ability for a merchant to manage alerts 422, open a learning center 424, and view trends 426.

Marketing Alerts

When manage alerts 422 is selected by a merchant, the system provides the merchant a manage alerts web page. The marketing alerts are provided by the system as notifications sent to the merchant via email, text message, mobile notices, web and other communication technologies when certain events of significant priority are identified, as determined by the system, and/or require immediate action, as determined by the system. The system continuously or regularly monitors information on the Internet at external third party websites and continuously or regularly monitors data within the system for trigger events. The system recognizes the following circumstances that may qualify as trigger events and provides merchants timely notification in the form of a marketing alert along with pertinent information and/or system recommended actions for the merchant to initiate in response to the trigger event.

The circumstances the system may recognize as trigger events include: 1) when a merchant's information is incorrect on third party websites; 2) when a merchant's information is inconsistent among third party websites; 3) when merchant provided offers are near expiration or have expired; 4) when merchant provided offers reach a system defined or merchant defined usage threshold; 5) when online communications on third party websites are about to be removed; 6) when the merchant's online score changes; 7) when the number of coupons or offers redeemed for a merchant changes significantly or exceeds a system or merchant defined threshold; 8) when the merchant's competitors take an action that may require a response, such as when a competitor has surpassed the merchant on selected measures or vice versa; 9) when the merchant receives a positive or negative review on a third party website or on the merchant's website; 10) when the merchant receives a positive or negative comment on a third party website or on the merchant's website; 11) when important and/or new recommendations from the recommendation engine are identified; 12) and when other information monitored by the system requires actions. The system allows the merchants to make well informed and timely decisions by providing the marketing alerts. The marketing alerts empower the merchant to improve their marketing and interface with customers more often, faster and more intelligently by providing recommended actions to take to increase or improve their marketing success in response to marketing alerts.

The system identifies trigger events based on priorities within the recommendation engine and/or the merchants stated priorities that have a time-important recommended action to take in response. By collecting all the information for these events, including which businesses qualify as competitors (based on system categorization of businesses and use of proximity measures, along with competitors named by the merchant within the system), the system regularly or continuously looks for information available at third party websites as well as within the system that qualifies as meeting the prioritized trigger events. When information meets the criteria for a trigger event, the system provides a marketing alert (via email, mobile app, text message, etc.) including key information to the merchant. The alert may also include links (URLs) that will direct the merchant to a system provided web page where the merchant can take action or initiate automated actions, such as, for example, guiding the merchant in replying to a review or claiming a listing on a third party website.

The evaluation of whether a circumstance qualifies as a trigger event is based on a rules-based engine along with merchant specified priorities. The marketing alerts include recommended actions to take in response to the particular triggering event. The system includes rules that specify what recommended actions should be included in the marketing alert based on the particular triggering event in combination with information obtained from one or more third party website and/or information in the system. The intelligence designed into the system provides alerts about a triggering event that includes a recommended action to be taken at a third party website or on the system. The recommended action may be provided as a link to an appropriate web page on the system. The recommended action may be automated or semi-automated by the system, so that when a merchant clicks an approval link the system performs all steps necessary to complete the action recommended or request inputs from the merchant as the system performs actions required to complete the recommendation in the background. The system may also allow the merchant to choose to automate an action on an ongoing basis without further merchant intervention or action. One example of this is that the system gives the merchant the option to allow the system to automatically synchronize listings on third party websites with the information approved in system. In non-automated recommendations, the system may provide detailed instructions and guidance that improves the ease by which the merchant can make the recommended change in comparison to if the merchant were to attempt to make the change without the guidance and assistance of the marketing alert or the system.

Alerts may be managed by the merchant on web pages within the system by accessing a text link, button or other user interface items, such as, for example, "manage alerts" text link 422 shown in FIG. 4. The system allows the merchant to designate how the merchant wants to receive each of different kinds of alerts, such as, for example, when a positive review is posted on a third party website, when a negative review is posted on a third party website, when the merchant is named in a posting or communication on a third party website of via a social media provider, when a maximum number of offers have been used, and others. The merchant may specify to receive alerts via one or more communications technologies including email and text messaging. The merchant may specify only to receive alerts when logged into the system.

Alerts may also be provided on the main web page or when viewing other web pages. Alerts may be provide as text listings within the web page with associated graphics, and may be provided as pop-up windows should a particular event occur when a merchant is using the system Learning Center Referring again to FIG. 4, when learning center 424 is selected, the system provides the merchant with offerings that describe the benefits and features of the system and may also provide an overview of the various third party websites and social media providers accessed by the system. The learning center may also provide information about the technology used in electronic marketing and about marketing in general. The learning center may include one or more of instructional and informational text documents, slide slows, animation and video for the purposes described in this paragraph.

Trend Graph-Timeline Chart

When view trends 426 is selected by a merchant, the system provides helpful visualization of the impact that actions have on the merchant's business as measured by selected metrics across time. The trends may be presented by the system as a system timeline chart. The system tracks actions taken by the merchant through the system as well as actions and external events to the system (price change, store remodeling, new product offerings, etc.) that are manually input into the system or captured by the system through crawling the Internet. The system tracks these time-stamped events against metrics like the overall marketing score and/or other data entered into or compiled the system. The system may display the measured movement in the metric up or down on a timeline chart with dots and icons that indicate events and actions. These dots and icons, when hovered over, may reveal more information about the event or action. This aspect of the system allows merchants to see what they did or what event happened that may have been the cause of the upward or downward change in the measured metric. By providing this timeline chart or other graphic, the system allows merchants to see trends, such as how well (or poorly) an action impacted the merchant's marketing score, sales revenue, customer volume, coupons printed or sold, number of emails collected, amount of consumer check-ins, amount of consumer likes of the merchant on third party websites and social media providers, etc.

The system automatically tracks merchant marketing actions and/or allows for the capture of events and external actions by the system. Based on the tracking, the system evaluates and measures the impact of the marketing actions and events. Tracking allows the system to provide the resulting timeline chart or other graphic which provides merchants a quick view of how actions and events the system are impacting their business over time.

B. Competition Component

Figure 5:
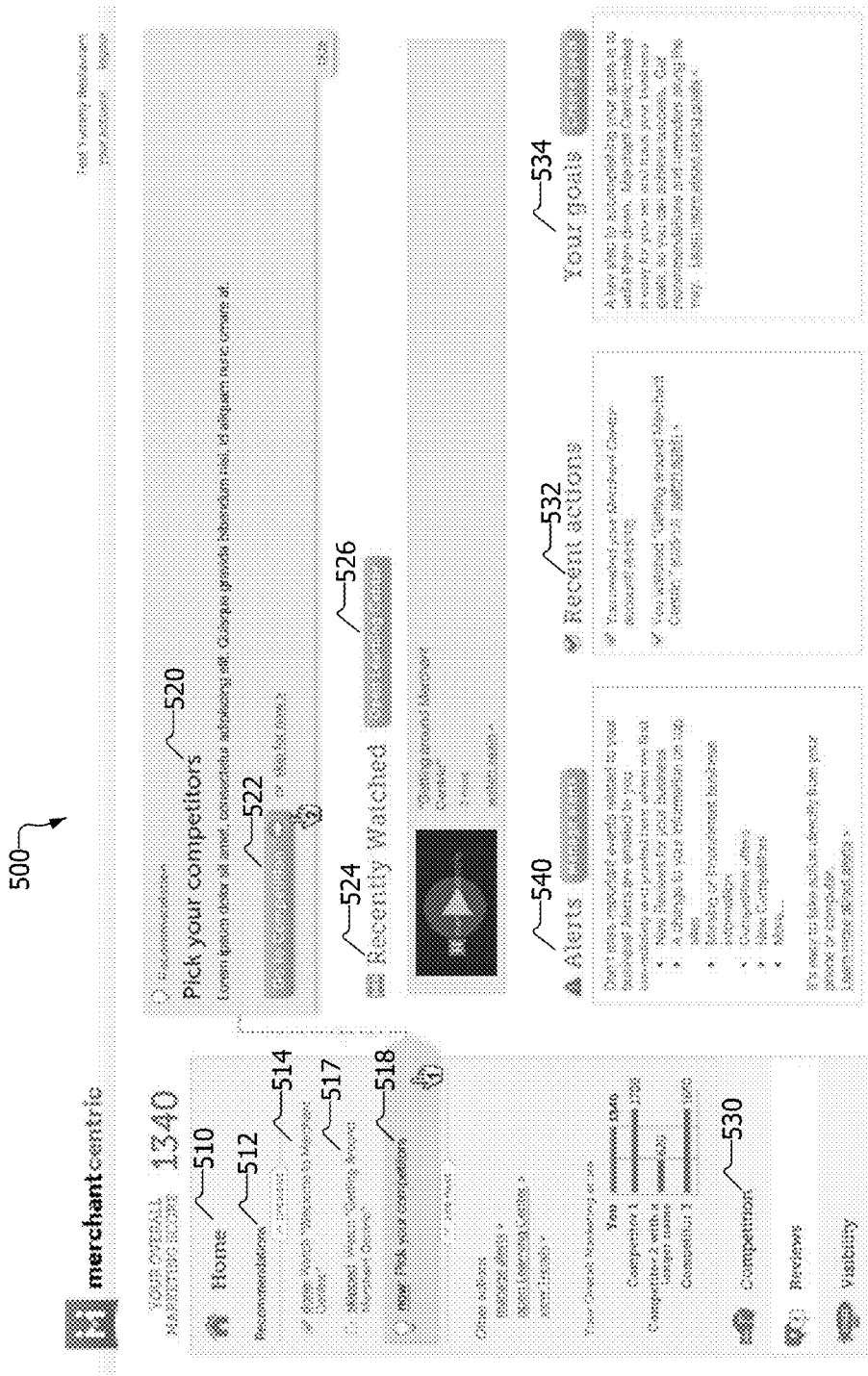
FIG. 5 is a screen shot of an example main web page showing the merchant's marketing score, a prompt to pick competitors, and other features.

When a merchant selects pick your competitors 418, the system alters and augments the main page 400 and provides web page 500 shown in FIG. 5. The web page 500 lists the title and information about pick your competitors 520 including a button to graphical link for a merchant to click on to go to competitors 522.

In web page 500, the home 510 recommendations 512 have been updated by the system to reflect that the merchant has watched the first recommended welcome video 514 and skipped the getting around video 517. Because the merchant has selected pick your competitors 518, the system has amended the label for this to state now.

The system also includes on web page 500 a recently watched video 524. Via web page 500 and various user interface constructs such as labeled button and text links located therein, the system gives merchants the ability to open the learning center 526, manage alerts 540, view recent actions, and create goals in a your goals section 534.

When a merchant selects go to competition 522 it is the same as the merchant selecting competition 530, selecting competition 430 in FIG. 4, and selecting competition 1102 in FIG. 11. When a merchant selects go to competition 522, competition 1102, competition 530 or competition 430, the system provides a competition web page like web page 600 shown in FIG. 6. The competition web page 600 provides a way for merchants to select and compare themselves to one or more competitors. As shown, recommendations 612 pertaining to competition 610 are provided, along with the status of the recommendations. The status of a "using your competitive snapshot" video 614 is listed as now as it has been highlighted by the merchant. A corresponding title and description of the video is provided at 616. The competitive snapshot 620 is provided and includes a comparison of key data between the merchant shown in merchant column 624 and competitors shown in columns 626. One or more competitors may be selected by the merchant and/or default system select competitors may be provided. In one version of the system, three competitors are shown along with the merchant in the competitive snapshot 620. For each of the competitors and the merchant, the system provided various data in the competitive snapshot, including the name or the merchant or competitor 630, the overall marketing score 632, a summary of reviews in a combination of text and graphics 634, text and bar graph showing participation of in third party website listings 638, text and bar graph showing participation in social media 640 (e.g., FACEBOOK likes, FOURSQUARE check-ins, etc.), and the number of active and/or expired offers 642. The competitive snapshot provided by the system makes it easy for a merchant to quickly evaluate how the merchant is taking advantage of online and other marketing opportunities when compared to one or more competitors.

When a merchant selects "pick your competitors" 418, 518 or 618 shown in FIGS. 4, 5 and 6, a pick your competition web page 700 may be provided by the system. The pick your competition web page 700 may include a text heading 702 designating the name of the web page. The pick your competition web page 700 provides merchants the ability to select competitors to be used in the competitive snapshot described above. The system provides merchants the ability to choose competitors by any of a variety of ways, including, for example, the system prepopulating a list 730 of likely competitors for the merchant to select from and/or prepopulating a map 720 showing likely competitors as push pins 724 or using other icons 728 to identify the competitors on the map in relation to the merchant 722. The prepopulated list may include one or more competitors designated by the merchant during creation of the merchants account with the system. The system may create a list of competitors based on information about the merchant stored in the merchant database. The system may consider the category and associated categories of the merchant, the kind of products or services provided, the geographical location, the pricing and the categories, among other factors, in determining which merchants should be listed as potential competitors and provided to the merchant upon request in a list 730 or on a map 720 or a combination of both of these (as shown). Push pins, numbers or other identifiers may be presented uniformly between the map and the text listing so that the merchant can readily identify and view competitors and their information on the map and in the listing. For example, push pins 724 have corresponding text 732 with adjacent lettered push pins for ready identification by the merchant. The system provided information about competitors in the competitor list 730 may include the name, address, category, distance from the merchant's location, and marketing score for each competitor.

The system allows a merchant to select a competitor from the map showing competitors and/or from a system provided list of competitors. A text link or other user interface construct may be provided to allow a merchant to select a competitor, such as "pick competitor" text link 736. When a merchant wishes to remove an already selected competitor, the system allows the merchant to do this by clicking on a text link or activating another user interface construct, such as, for example, remove text link 738.

The system may allow the merchant to elect to select from only system picked likely competitors by clicking on a graphical user interface items such as text link 704. The system may display likely competitors that are within a merchant specified geographical area. This may be achieved by the system allowing the merchant to select see competitors within a certain number of miles; competitors in certain towns, neighborhoods, or districts; and a certain number of competitors that are closest geographically to the business, as shown by text link 706. The system may allow the merchant to restrict the list of competitors by categories selected by the merchant via a user interface construct such as a menu 708 or via merchant text entry. The system may allow a merchant to specify the name of a specific competitor, as shown in text prompt and text entry field 710.

The system provides a text link, button or other user interface construct that allows the merchant to save picked competitors, signifying that the merchant has completed selecting competitors to be used in other portions of the system. In the example shown, a button labeled "save picked competitors" is provided by the system for this purpose.

C. The Reviews/Reputation Component

Referring again to FIG. 4, when a merchant selects reviews 432, a merchant's reviews web page 800 may be provided, as shown in FIG. 8. In another embodiment, this component may be referred to as reputation 1103 as shown in FIG. 11. When a merchant selects reputation 1103, a merchant's reviews web page 800 may be provided, as shown in FIG. 8. Referring now to FIG. 8, in the review 810 area of the merchant's reviews web page 800, the system provides multiple recommendations 812 for the merchant. The action now— watch "review are really ongoing feedback" 814 is selected and a corresponding area 816 of the web page provides information and a link to watch the video. The heart of the merchant's reviews web page 800 is the your reviews section 820 which the system provides to allows merchants to review and take actions regarding reviews of the merchant on third party websites. Reviews from social media providers may also be included. The system can provide review information because the system regularly crawls the Internet, search for reviews and other information regarding the merchant, and stores the review and other information in a database. The review information may be stored with a merchant record in the merchant database or may be stored in a separate review database such that the merchant database and the review database are cross linked for easy access of information by the system when needed.

The system provides a listing of reviews for the merchant in the review section 820. The system provides the merchant the ability to select which reviews are displayed to the merchant. The system provides a user interface that allows the merchant to select various parameters 822 regarding the display of reviews. The review listing parameters 822 include from which third party websites reviews should be displayed (examples include, all websites or a specific website); only positive, only neutral, or only negative review; and a time constraint 823 (such as before or after a particular date, or only the newest). The system also allows the merchant to select the order of display, such as in date order, grouped according to positive and negative, grouped according to the source, and others. As shown in merchant's reviews web page 800, the system allows the merchant to select the display order 824 from oldest to newest or newest to oldest.

The merchant reviews area 820 also displays information summarizing the review being shown 824 and the average rating 826. The summary of the review may include a list of the websites represented, raw numbers of neutral, positive and negative reviews, percentages of neutral, positive and negative reviews, and a total number of reviews from the websites represented.

The merchant reviews shown in web page 800 include one review from GOOGLE PLACES 830 and one review from YELP. For each review displayed, the system provides various information including, the name of the website and its associated logo 830 and 840, the star rating of the review 831 if applicable, the full substance of the review 832, the date 833 the review was posted and the ID of the person posting the review 834 if available. Additional information about the reviewer may also be provided, including the number of followers of the reviewer, a photo of the reviewer, and links to meta data on the reviewer.

Review Verification

As part of the reviews/reputation component, the system may verify customers' reviews. The system may verify reviews obtained from third party websites by confirming that the reviewer has patronized the business being reviewed. Reviewers may be classified as verified and non-verified. The system may display an icon or text information adjacent to the review name 834 to indicate to the merchant whether the reviewer has been verified or not. An icon or text information may alternatively be provided adjacent to the rating 831 and under the name of the third party website or social media provider 830 and 840. This adds credibility to the review versus a non-verified customer, which may be anyone writing a review who wishes to influence the opinions of others about the merchant for their own motives, without having patronized the merchant's business. Verification makes it more difficult to create credible fake reviews, which may be created by the merchant's competitors or someone remotely hired to promote positive or negative reviews.

To perform verification, the system ties consumer identification information, such as name, email address, browser, social IDs, etc. to offer redemptions as described herein. When a merchant enters an offer into the system as being used by a consumer (via any technique supported by the system) or when the system captures offer information using links and other automated techniques, the system ties that offer to the consumer and verifies that the consumer has patronized the merchant. The system checks reviews available for the merchant and the identifying reviewer information, such as, the YELP ID, FACEBOOK ID, email address, name, and others. When there are matches, the system provides an indication that the review the reviewer has written is from a verified customer. The system may also provide authentication to the publishing third party website that the review which the reviewer has written was from a verified customer. The system may export reviewer verification results to third party websites in an effort to curtail fake reviews by competitors or persons hired to promote positive or negative reviews.

The verification provided by the system provides an advantage to media publishers, merchants and consumers as the system provides processing to verify that online reviews are provided by real customers versus fake reviews driven by other motives. The system allows merchants and others a reliable way to accurately monitor reviews and remove the potential for taking actions based on fraudulent reviews. The system connects offline activities, such as patronage at a merchant's storefront, with the identity of a consumer, where the consumer identity is subsequently searched and connected with reviews found for the same merchant on other websites. The system may provide positive verification information in bulk to review publishers for verified customers and participating merchants.

Acting on Reviews

The system also provides merchants the ability to take actions regarding reviews by providing buttons, text links or other user interface items that allows the merchant to reply to the review 835, share the review 836 and go directly to the review on the source website 838. Depending on the third party website, the system may suggest a reply from the system reply library. The system may determine a suggested replay based on sentiment analysis or keywords within the review. The system allows merchants to edit the suggested reply or leave as is and then upon a single click by the merchant automatically login to the third party website, find the review and post the reply for the merchant. The system also educates the merchant about reply strategies. Where automation is not in place, the system guides the merchant through the process of replying to the review by providing text and/or video instructions along with a template reply from the system reply library and direct links to where the merchant can more easily complete the process. In either case the system may provide be additional educational instructions and recommendations, such as whether to reply publically or privately. In addition, the system may automatically reply to reviews within a system generated alert email with a single click (or other electronic communication) using a reply provided by the system that may be a system default or pre-approved or pre-selected by the merchant.

The system may also provide the merchant the ability to take additional actions 850 regarding reviews. The system may allow the merchant to learn more about actions to take to obtain and promote customer review by providing text link "get new reviews" 852. An example system recommendation to get new reviews is a recommendation for the merchant to place a link and/or graphic on the merchant's website asking customer to click to place a review on a third party website, such as YELP or GOOGLE places. The system may allow the merchant to embed a special offer or promotion within a reply to a review. The special offer or promotion is generated and fulfilled by the system and associated with the reply. The system may allow a merchant to track reviews. The system may allow a merchant to receive alerts on other reviews by the reviewer. The system may evaluate a reviewer, including whether the reviewer may be a potential competitor or prone to rants and negative reviews for most of the businesses they review. This information may be provided to the merchant and may be used by the merchant to request removal of a review on a third party website that can be shown to be likely from a competitor or chronic ranter. The system may allow the merchant to request to examine review trends such as by providing text link "reviews trends" 854. When a merchant selects "reviews trends" 854, the system provides a web page that allows a merchant to evaluate how the number and/or quality of reviews has changed over time. The system provides text a graphic, typically a bar chart or graph that allows the merchant to readily understand whether reviews for the merchant have been increasing in rating and/or numerosity over a time period. The system may allow the merchant to set a time period such as over a month, quarter, year, or merchant selected or specified number of years or months. The system may allow the merchant to specify which of the third party websites and social media providers should be represented in the reviews trend graph. The reviews trends page is similar to the view trends 426 described above, but is exclusively regarding reviews.

The merchant's reviews web page 800 may also include an area that displays the merchant's reviews score in relation to one or more competitors. In the example merchant's reviews web page 800, the system provides a reviews score comparison bar graph under the heading your review score 860. The reviews score comparison bar graph shown under the heading 860 includes the merchant's name, the name of three competitors and a bar graph showing the reviews score for the merchant and the three competitors. The system provided reviews score comparison bar graph allows merchants to readily understand how their reviews rate in comparison to their selected competitors.

In the merchant's reviews web page 800, the system may also provide the merchant the ability to view the reviews of competitors. A button, text link or other user interface item may be provided by the system for this purpose. When a merchant clicks on text link "see a competitor's reviews" 821, the system provides a competitor's reviews web page 900 as shown in FIG. 9.

Competitor's Reviews

Figure 9:
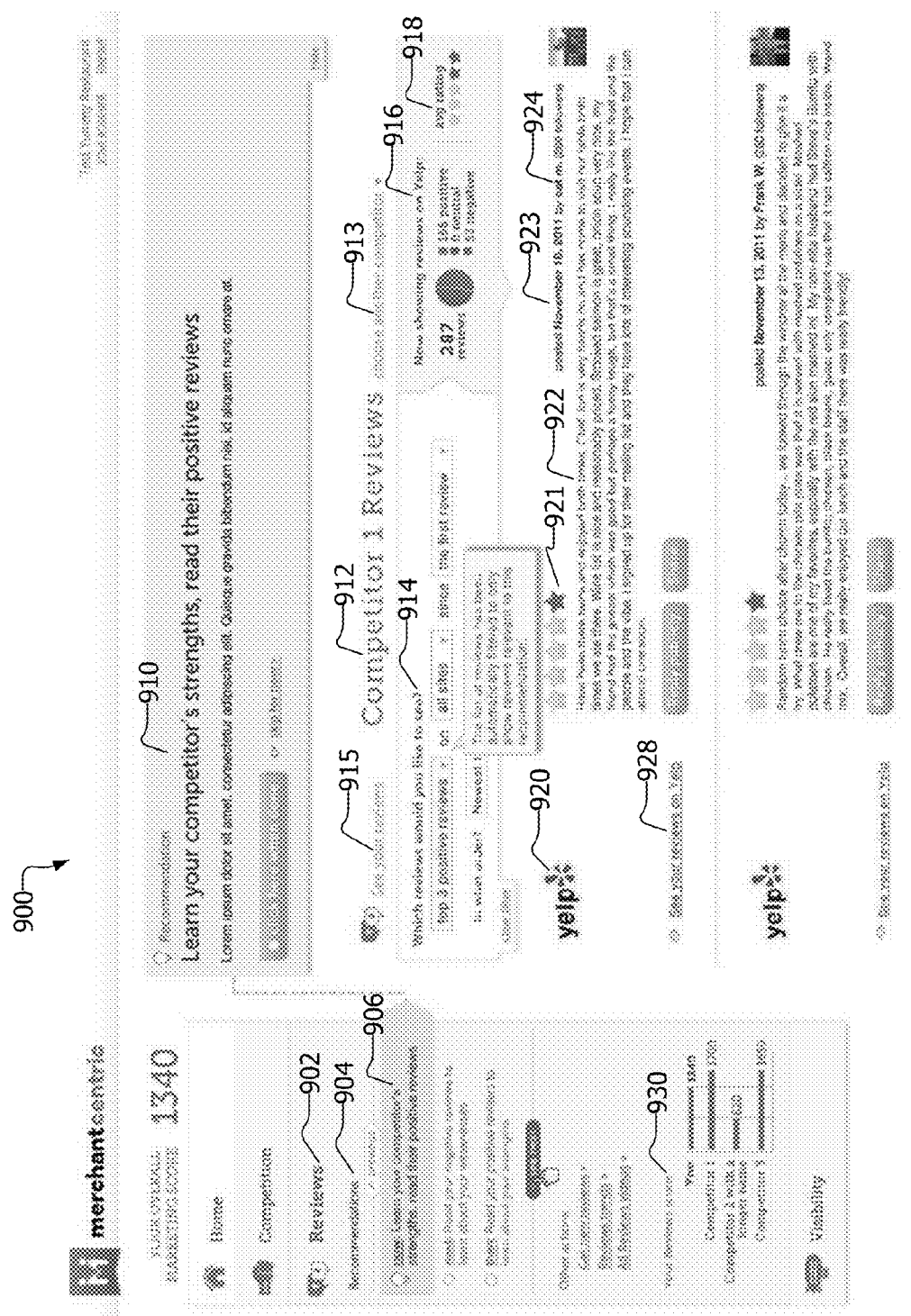
FIG. 9 is a screen shot of an example competitor's reviews web page.

Referring to FIG. 9, a competitor's reviews web page 900 similar to web page 800 is provided. The reviews section 902 includes recommendations 904, and the recommendation "now: learn your competitor's strengths . . ." 906 is selected. A corresponding page area 910 that provides information about how a merchant can benefit from using this part of the system is provided.

The system provides a listing of reviews for a merchant selected competing merchant in the competitor section 912. In one embodiment, the competitor is a system default first competitor. The system allows the merchant to select which competitor's reviews to view by providing a text link, button or other user interface item for this purpose, such as, for example, "choose another competitor" text link 913. The system provides the merchant the ability to select which reviews of the competitor are displayed to the merchant. The system provides a user interface that allows the merchant to select various parameters 914 regarding the display of reviews. The review listing parameters 914 include from which third party websites reviews should be displayed (examples include, all websites or a specific website); only positive or only negative review; and a time constraint (such as before or after a particular date, or only the newest). The system also allows the merchant to select the order of display of the review, such as in date order, grouped according to positive and negative, grouped according to the source website, and others. The system allows the merchant to select the display order from oldest to newest or newest to oldest.

The competitor reviews area 912 also displays information summarizing the reviews being shown 916 and the average rating 918. The summary of the review may include a list of the websites represented, raw numbers of neutral, positive and negative reviews, percentages of neutral, positive and negative reviews, and a total number of reviews from the websites represented.

The competitor's reviews shown in example web page 900 include two reviews from YELP. For each review displayed, the system provides various information including, the name of the website and its associated logo 930, the star rating of the review 921 if applicable, the full substance of the review 922, the date 923 the review was posted and the ID of the person posting the review 924 if available. Additional information about the reviewer may also be provided, including the number of followers of the reviewer and a photo of the reviewer. Text and/or graphic showing whether the reviewer is verified (as described above) may also be provided near or adjacent to the reviewer ID 924 or the name and logo of the website 930. The system also provides the merchant the ability to view the competitor's reviews on the third party website. A text link button or other user interface construct may be provided for this purposes, such as, "see reviews on YELP" 928.

The system also provides the merchant the ability to switch to view the merchant's reviews on third party websites. A text link button or other user interface construct may be provided for this purposes, such as, "see your reviews" 915.

D. The Visibility Component—Exposure

Figure 10A:
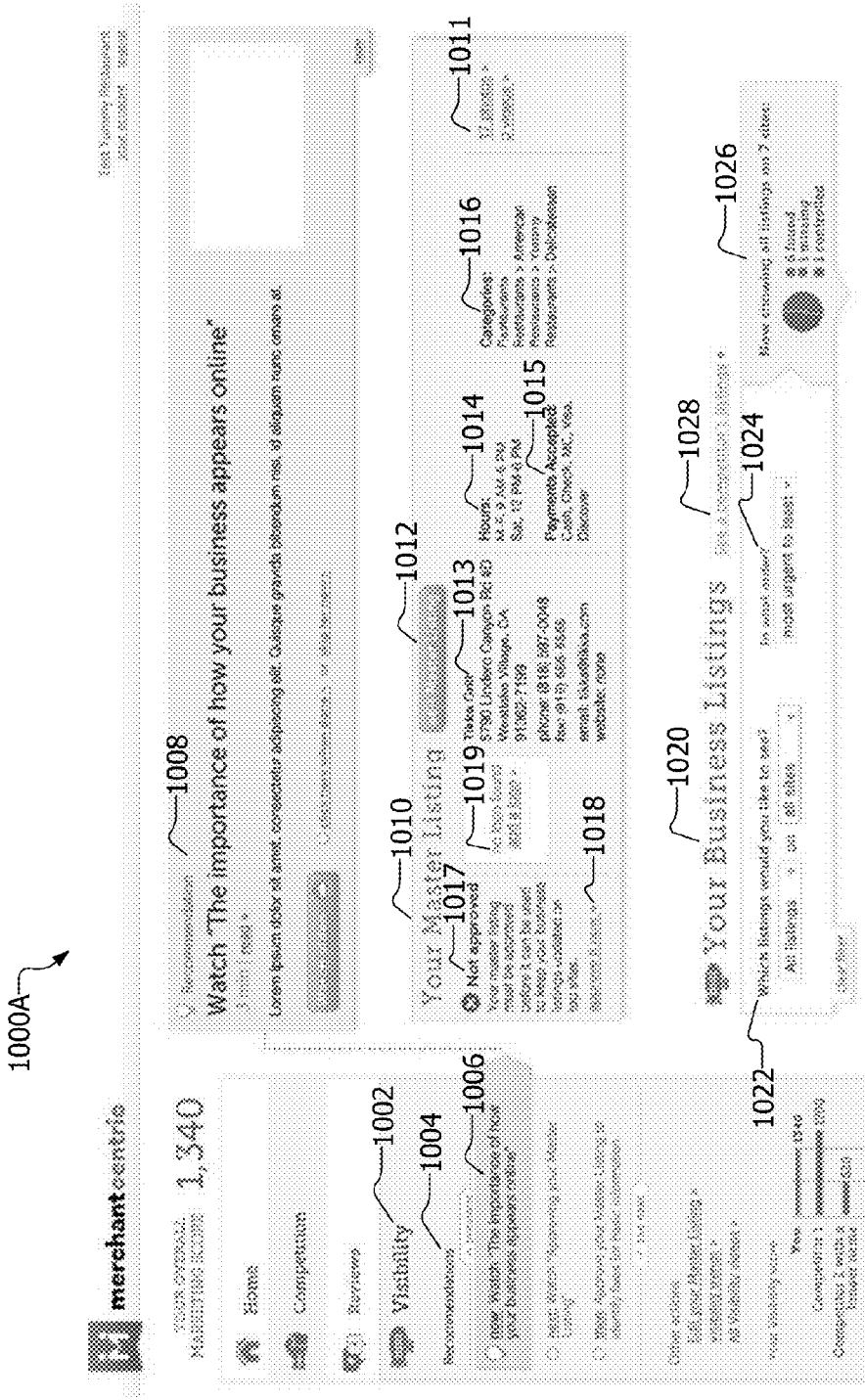
FIG. 10A is a screen shot of an example top portion of a visibility web page showing a merchant's master listing.
Figure 10B:
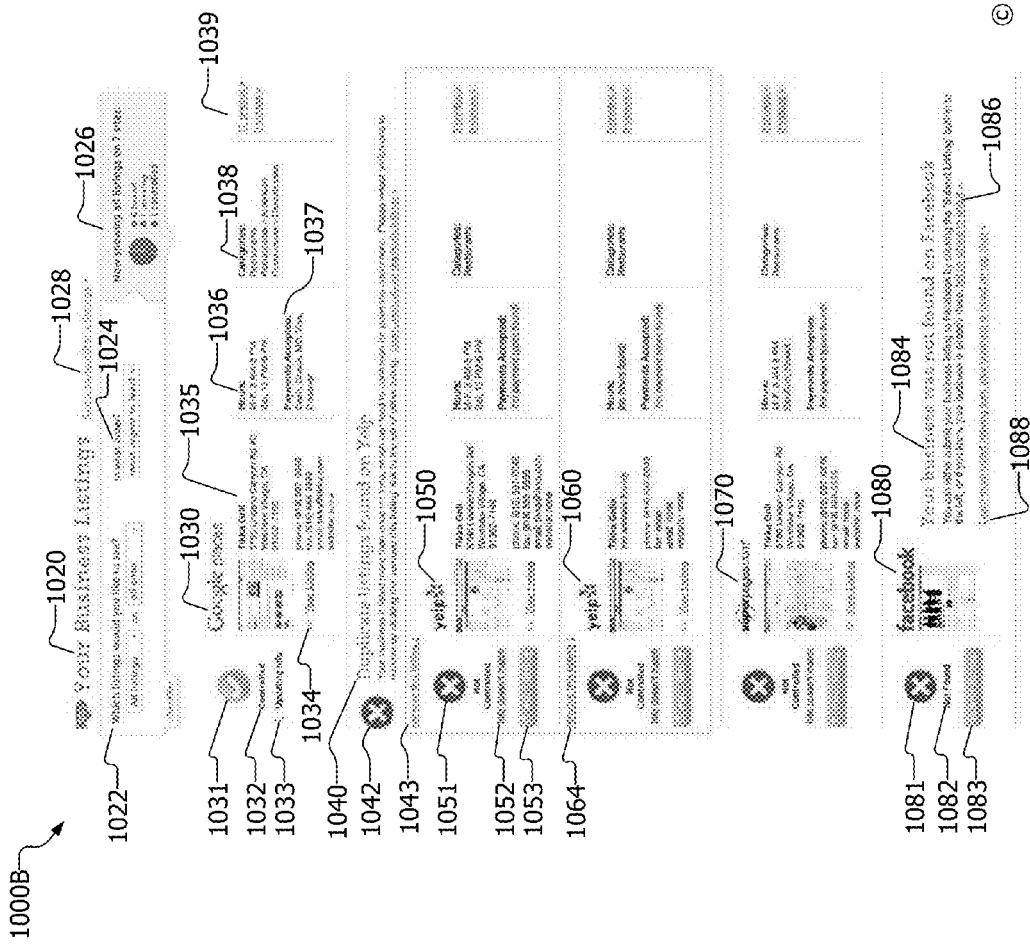
FIG. 10B is a screen shot of an example bottom portion of a visibility web page showing a merchant's business listings on third party websites.

Referring again to FIG. 4, when a merchant selects visibility 434 from the main web page 400, the system provides a web page 1000A/1000B shown in FIGS. 10A and 10B that displays information about how the merchant looks on multiple third party websites and online media offerings, and allows the merchant the ability to manage the merchant's online information. Visibility may also be referred to as exposure 1104 as shown in FIG. 11, and the discussion herein regarding visibility also applies to exposure. The visibility web page 1000 allows the merchant to provide merchant information and amend merchant information on multiple third party websites in a single place. Any changes made by a merchant to merchant information via the system is promulgated to third party websites. This central point of control allows the merchant to make changes in one place without having to visit and log into to multiple third party websites such as, for example, on YELP, FACEBOOK, GOOGLE PLACES, URBANSPOON, SUPERPAGES.COM, and others. The visibility web page allows for business identity management.

FIGS. 10A and 10B are an example visibility or exposure web page 1000A/1000B. The top portion of the visibility web page 1000A is shown in FIG. 10A while the bottom portion of the visibility web page 1000B, the business listing portion of the web page, is shown in FIG. 10B. The visibility web page 1000A may include a title or other text 1002 that informs the merchant of the content of the web page provided by the system. As with other web pages described herein, the system provides recommendations 1004 for the merchant. The now watch a video 1006 recommendation is highlighted and a corresponding pane 1008 with information about the video is provided. A master listing 1010 for the merchant is provided by the system by default, based on the basic data obtained by the system (described above).

The business identity management feature allows merchants to manage their business listing across various online websites from a single online secure location. This allows merchants to control their online identity. The system provides processes that identify and automate or semi-automate the merchant claiming, updating and enhancing their listings on many different third party websites and a social media providers without having to remember different accounts, login passwords and varied processes. The system helps locate the merchant's listings and notifies the merchant when information is not accurate or out of synch with latest enhancements and messaging. The system allows the merchant to access and update their business listing information, including updating or adding enhanced information, at any time and either change a single listing or multiple listings with one change (removing the effort of having to repeat implementation of the change across multiple websites). Additionally, the system provides a user interface that allows the merchant to view activity and reports provided regarding third party websites to help evaluate the relative importance of the third party websites.

The system searches the web for the merchant's business listings using various identifying information, including but not limited to primary phone number, address information, name, category, and others to identify the merchant's listing on numerous third party websites, as shown in blocks 210, 220 and 235 of FIG. 2. The system collects information listed for the merchant and compares it to a master identity record for accuracy. The system presents statuses for all listings found, including whether the listing has been claimed, to the merchant with indicators for actions available (get listed, view listing, claim now, authorize now, sync) and indicators for actions already taken and the status of actions taken, along with summary listing info. The system allows the merchant to view instructions on how to claim a listing in order to be authorized to control changing the information. Where integrated, the process of claiming the listing is automated or semi-automated so the merchant can initiate the process by clicking the claim now button in the system and then following the instructions, initiate a call from the website to the merchants store to validate authenticity. The intermediate steps required by the website being claimed are initiated by the system in the background and not exposed to the merchant, thus simplifying the process for the merchant.

Where the claiming process is not integrated, the system provides instructions for the merchant to claim the listing at the website and return and enter the credentials back into the system, thereby authorizing access for that listing from the system to enable automated monitoring, content updates and activity reporting. All listings identified by the system are monitored and compared for accuracy against the master record or profile for the merchant by the system.

In one embodiment, the system defaults the master record or master listing 1010 for the merchant to data found on one more well-known third party websites (e.g. GOOGLE PLACES, SUPERPAGES.COM, YELP and others) until the merchant changes default data. The data included in the master record may include at a minimum name, address and telephone number for the merchant and may also include an email address and website shown as 1013 in FIG. 10. The master record may also include hours of operation 1014, payment types accepted 1015, one or more categories 1016 for the merchant, a logo for the merchant 1019, and any photos or video for the merchant 1011 or links thereto. The system allows the merchant to change the master record 1010 by selecting button 1012 to edit master listing. When the merchant approves the master listing 1018 and turns on automatic synchronization, the system automatically updates all third party websites that are controlled through the system so that merchant information on the third party websites matches the information specified in the master listing for the merchant. Automatic synchronization may be a default feature of the system. The system may provide an icon or text that indicates that the listing is approved or not approved. 1017. The system may provide an icon or text that indicates that automatic synchronization is active. The system may provide a button or text link that brings up a user interface that allows the merchant to set automatic synchronization to on or off. The system automatically checks claimed websites and synchronizes the information obtained from the websites with master record selected fields. In this way, the system ensures that claimed websites are always accurate and updated with data entered into the master record profile so all linked websites are updated with a single change to the master record profile.

When there is a change to the master record profile, the system uses stored merchant credentials for each of the linked third party websites to access the merchant's account and access the web pages where the merchant's data is managed. The new or updated data is submitted and saved. The system identifies the websites where submissions have been made as "sync in progress" until it sees the data is consistent with the master record profile. Then the system changes the status to "in sync". In a similar fashion, the system uses stored merchant credentials for the websites to periodically login and access activity reporting information and/or utilize email updates from merchant listings on third party websites to compile relevant website activity for the merchants' listings, such as number of times appeared in search, number of times viewed, number of times actions are taken (e.g., clicked, mapped, emailed, etc.). The system provides this data in various forms, for example, for the individual website providing the listings, aggregated and/or sorted for a system determined level of priority.

The system provides a way for merchants to claim their third party website listings with the associated control of claiming individual website credentials utilizing existing listing websites' owner verification. By doing this, the system reduces the chance of fraud or of listings being hijacked. The system provides a dashboard for ongoing management and enhancement of each third party website listing individually and integrates reporting for the listings from the third party websites.

In the business listings 1020 portion of the visibility web page 1000A/1000B, the system provides the merchant the ability to select which listings will be displayed 1022 and in what order 1024. The listings selection area 1022 may include two components, one regarding the kinds, status or timing of listings and references of the merchant, and the other regarding the third party website or online media provider. In the listings selection area 1022 of the business listings portion of the visibility web page, the system may provide menus, radio buttons and/or other user interface constructs that allow a merchant to select to view all listings on all websites (as shown), only modified or changed listings, only references or mentions on social media websites (e.g., TWITTER, FACEBOOK, GOOGLE PLACES, PINTEREST, and others), only review websites (URBANSPOON, YELP, and others), only listings and directories (e.g., YP.COM, YELLOWPAGES.COM, WHITEPAGES.COM and others), only controlled listings, only websites where the merchant is missing/does not appear, only websites where merchant is listed and not controlled, and others. The various information provided on third party websites and other online media providers is captured by the system during regular crawling of the Internet by the system. The system checks for special occurrences that may be harmful to a merchant's marketing and advertising message. The system checks for inconsistencies of information between the third party websites and social media providers and also checks for missing information and duplicate accounts, as well as other anomalies, inconsistencies and problems. The system further checks key third party websites and social media providers and notes if the merchant does not have an account there.

The system stores the information in one or more databases including a merchant database. The system also stores specific information when there is a listing inconsistency or incorrect information and when a merchant is discovered not to have an account at a key third party website or social media providers.

When a merchant requests that visibility listings be provided, the system refers to its databases and provides the requested information. The information stored by the system and retrieved for this purposes includes name of the merchant, address of the merchant, telephone number(s) of the merchant, hours of operation for the merchant, email address for the merchant, website address for the merchant, descriptive categories listed for the merchant, kinds of payment accepted, TWITTER account name, FACEBOOK account name and page, and any media such as photos and videos.

In the example shown, the GOOGLE PLACES listing 1030 includes name, address, telephone email and website information 1035 in one column, hours of operation 1036 and kinds of payment accepted 1037 in a second column, descriptive categories 1038 in a third column and links to any photos or video 1039 in a fourth column. Similar information is provided regarding the appearance of the merchant in YELP 1050 and 1052 and SUPERPAGES.COM 1070. In addition, information stating that the merchant does not appear or cannot be found on FACEBOOK 1080 is provided.

An additional column of extra/status information is also provided in an extra column. In the example shown in the business listing portion of the visibility web page 1000B, the extra column is on the left side of the business listings. The extra column includes graphics and text that state whether the particular third party website and social media account has been claimed and is controlled by the merchant through the system. The GOOGLE PLACES account includes a check mark icon 1031 and accompanying text 1032 that signifies and states that the account is controlled by the merchant through the system. In addition, an icon and text 1033 indicates that the system is currently updating the information obtained from the merchant's account at the third party website. The system automatically updates controlled listings when the system crawls controlled third party listings and finds them to be out of sync with the approved information in master listings in the system.

When multiple listings on a website are discovered, the system displays this information in a separate row or pane followed by the information for the two or more redundant listings for the merchant. As shown in the example business listing portion of the visibility web page 1000B, the system provides a text 1040 and graphic 1042 indication that duplicate listings for the merchant found were found on YELP, followed by the information from the listings 1050 and 1060.

When discrepancies among information located on two or more third party websites or social media providers, the discrepancies between the listings are highlighted or distinguished. This may be achieved by, for example, color highlighting in yellow, as shown in listings 1050, 1060 and 1070. In listing 1050, the status/extra column indicates by an icon 1051 and associated text that the listing is not controlled, and text information 1052 is provided that informs the merchant that "info doesn't match" between the listing and the approved listing information in the master listing in the system, in this example master listing 1010 shown in FIG. 10A.

In the status/extra column, the system provides a button 1053 that allows the merchant to gain control of the listing. In addition, the system provides a text link 1064 that allows the merchant to remove the display and associated information of the duplicate listing 1060 from YELP from within the system. That is, the merchant uses the system to remove the duplicate YELP listing without having to go to the YELP website. The system may also recommend steps and semi-automate the steps necessary to request the removal of the listing from the third party website or the steps to merge the duplicate listings on the third party website, depending on options available from the third party website.

When the system has determined that the merchant does not have an account at key third party websites and social media providers, the system provides a listing in the business listings portion 1000B of the visibility page that specifies this. As shown in FACEBOOK listing 1080, the status/extra column includes an icon 1080 and associated text 1081 that indicates to the merchant that no account exists for the merchant on FACEBOOK. The earlier described four columns of information provided by for a listing are replaced by a single column that includes the name of the third party website or social media provider 1080 and a statement that no account was found 1084.

The system may also provide three additional links when an account is not found. The system may provide a link for the merchant to click on to indicate the name of the merchant's account at the third party website or social media provider, as shown by text link "tell us where to find it" 1086. The system may provide a link that plays a video and/or provides instructions about how to create and account or otherwise obtain and promote an internet presence, as shown by "learn more about making sure your business is found on top websites" text link 1088. The system may provide a link that allows the merchant to create an account or submit a listing with a third party website or Internet media provider merchant. This is shown in web page portion 1000B by the "submit listing" button 1083 in the status/extra column for the FACEBOOK 1080 listing.

When a merchant selects to submit a listing, gain control of a listing or remove a listing or account on a third party website or social media provider, depending on the third party website, the system either guides the merchant through the process of taking the action by providing text and/or video instructions, and if applicable template communications or forms, or the system guides the merchant through taking action on the system, including providing text and/or video instructions, which the system submits to the third party website on behalf of the merchant. The system may fully automate the submission of the merchant's business information to the third party website.

E. The Communications Component

When a merchant selects communications (not shown) from the main web page 400 or communications 1105 from a web page formatted like that shown in FIG. 11, a communications web page 1100 may be provided as shown in FIG. 11. Referring now to FIG. 11, as with the other web pages provided by the system, recommendations including the opportunity to view instructional videos are provided 1110. In the communications web page 1100, the system provides the merchant the ability to view and send messages using email and social media providers. Using buttons and text links, the system allows the merchant to prepare and send a message 1110, view messages 1140, and manage a contacts database or library 1150.

As above with the visibility web page, the system provides a central point for merchants to use to communicate with consumers. In response to receiving a merchant selection to send a message 1110, the system gives the merchant the option to name the message 1112 and choose how the message will be distributed. 1120. The system provides the merchant the ability to select from one or more of sending an email note from the merchant's default email account 1126, communicating using one or more social media providers 1124, or post a message on one or more listing websites 1122. In another version, the system may allow the merchant to select from among multiple email accounts. The system assists the merchant in writing the message by allowing the merchant to select 1130 from sending a new message 1132 or basing the message on one from a system provided communications library 1134 that may include earlier sent message and/or system generated recommended messages stored in a communications library. The system allows the merchant to send email communications directly from the system without having to login at a third party email provider website and send social media communications from the system without separately accessing a social media provider. The communication component saves the merchant time and allows the merchant to communicate more often and more effectively than otherwise possible.

Communications Library

The communications component provides the merchant with a relevant library of communications and responses for different circumstances that relate to their business and their consumer interactions. When send a message 1110 is selected by a merchant, the system provides a searchable and sortable listing of kinds of communications that may be arranged by categories, types of communications and may be referred to as a communications library. The communications library may include templates for various communications including, for example, thank you for your visit, thank you for the good review, apologies for bad experience, request for endorsement, request for referral, etc. Additionally, the system tracks which messages/replies have been used, how many times, and when last used. The system allows for sorting based on these measures. When a message/reply includes a clickable event and/or offer, the system provides a user interface that allows the merchant to view the library according to the related metrics, such as number of consumer clicks and the consumer click rate. The communications component allows merchants to communicate more effectively and more often with consumers, saving time and allowing merchants to learn which messages are best received.

The communications component includes proprietary content created specifically for different categories of merchants and different types of required business circumstances. Each message has associated meta data, including a category and type of message. The meta data also includes data that is updated with merchant usage data and consumer action data. The meta data allows the system to offer the communications library in a searchable and sortable manner to merchants. The system enables the merchants to search the content of messages in the communications library using keyword text search.

The system aggregates and makes available sample communications and responses specifically geared for merchants. These sample communications and responses are sortable by category of business and/or type of communication along with related performance/meta data related to the use of the message. The communications library is integrated directly into the system guided process of developing consumer communications. The system allows merchants to view a message history including when a message was last used, the responses received, the number of times opened, and other system measurable merchant and consumer access to the messages. This feature may be accessed by the merchant clicking on "view your sent messages" 1140 or other system provided user interface item.

Contact Management

When the merchant wants to manage their contacts library, the merchant selects the system provided text link, button or other user interface element such as "manage your contacts library" 1150. The contact library may include both prospects and customers, and the entries may be designated and coded appropriately. The system allows merchants to access information about the consumers within their database, and allows merchants to eliminate duplicate counting of consumers within their database. The system may flag those consumer database entries that appear to be duplicates and provide the ability for the merchant to merge or eliminate entries.

The system may automatically assist the merchant in keeping a clean database free from duplicates. This increases the effectiveness of merchant offers, allows merchants to be provided a more accurate count of unique consumers within their consumer database, and reduces the annoyance to consumers of a merchant over-communicating with the same consumer.

Consumers may be represented within a database via different contact identifiers or representations, such as email, YELP ID, FACEBOOK connection, TWITTER follower, cookie code (or other anonymous tag) etc. However, multiple representations for a consumer may have been collected at different times and may not be able to be identified as being the same consumer. Other merchants may have identified the correspondence between different contacts, or the system may have identified different contacts as the same consumer via IP address, cookie or evercookie. When the system is able to identify multiple contact entries for the same consumer, the system applies that knowledge to the consumer database for the merchant without revealing the information that the specific contact entries are not connected. That is, the system provides an actual count of unique consumers within a merchant's database without revealing which contact entries are redundant to the merchant.

The system may employ decision rules to send messages only to a single email address or using only a single communications medium (e.g., email and not both email and text message) of redundant contact representations or identifiers for the same consumer, without revealing to the merchant which contacts are connected behind the scenes. Similarly, when a consumer, already present within a merchant's consumer database, redeems an offer from that merchant using a new contact representation or identifier that is not within the merchant's database, instead of being viewed as a new customer, the system recognizes the customer within the campaign results as a returning customer instead of a new customer. This improves the ability of the system to accurately track communications and offers, and improves the results provided by the system to the merchant in the way of charts, data, graphics and the like.

F. The Get Customers Component

Figure 12:
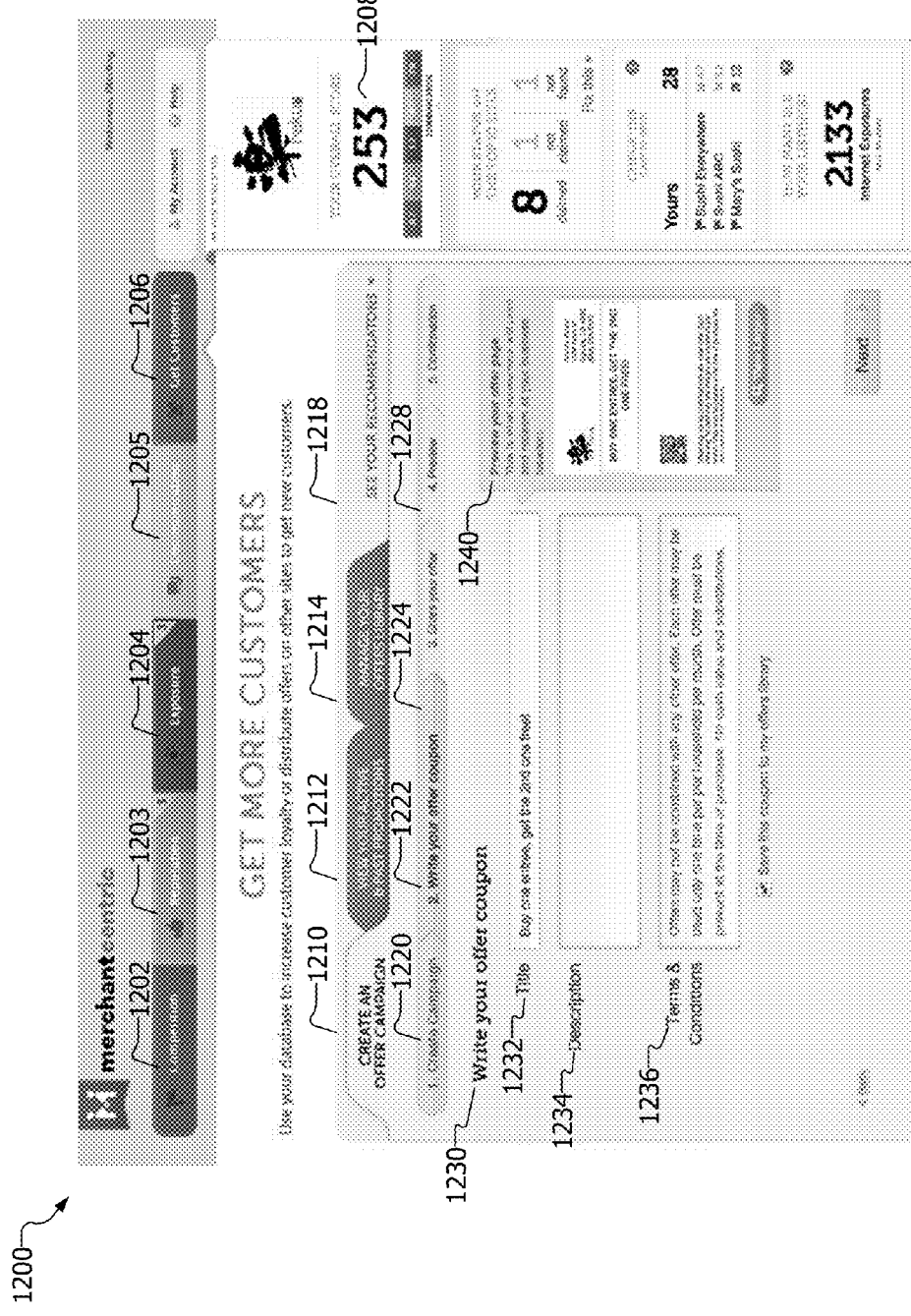
FIG. 12 is a screen shot of an example web page showing a get customers web page.
Figure 13:
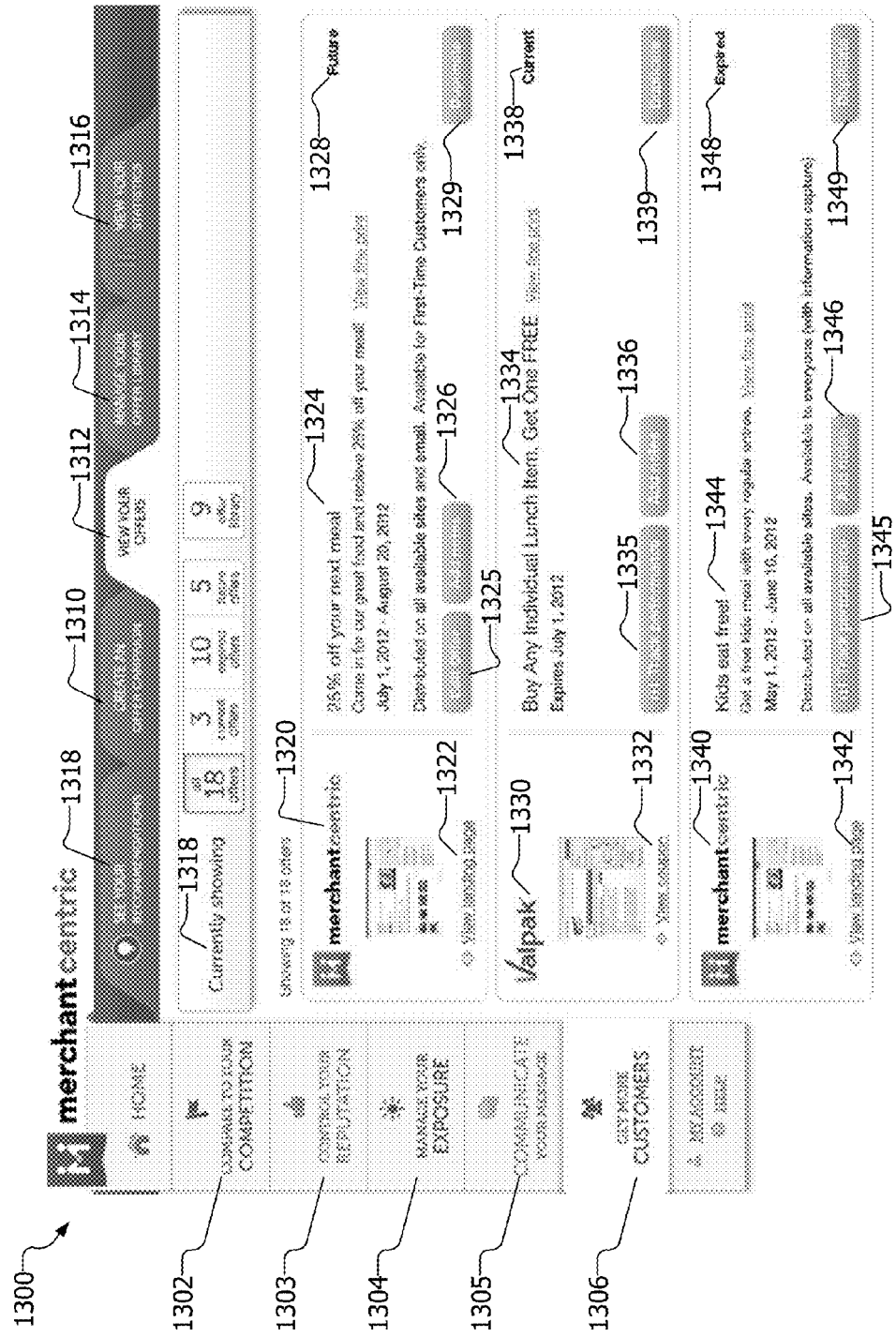
FIG. 13 is a screen shot of an example web page showing a view offers web page.

When a merchant selects get customers (not shown) from a main web page 400, get customers 1106 from the communications web page 1100, get customers 1206 and 1306 from web page 1200 and 1300, a get customers web page 1200 is provided by the system. Referring to FIGS. 12 and 13, via the get customers web page, the system allows the merchant to create an offer campaign 1210/1310, view the merchant's offers 1212/1312, and manage the merchant's offer library 1214/1314.

Referring to FIG. 12, the get customers web page 1200 may provide system features grouped in components displayed horizontally across the top of the web page 1200 as competition 1202, reputation 1203, exposure 1204, communications 1205 and get customers 1206. Also displayed prominently is the subscribed merchant's overall score 1208.

When the merchant selects get customers 1106 or 1206 from web pagers 1100 or 1200, the system may provide the merchant an easy to follow sequence of tabbed activities to create an offer 1210. The kinds of offers include discounts, coupons and other promotions. The system may guide the merchant in creating an offer 120 in a sequence that may include create campaign 1220, write your offer 1222, share your offer 1224, preview 1226 and confirm/send 1228. The system may guide the merchant in creating an offer by providing text entry fields that may be preloaded based on system recommended content and system prepared offers available in a merchant offer library 1214. The text entry fields in a write your offer coupon area 1230 may include title 1232 and description 1234 of the offer. Preloaded system recommended text may include the title 1232 and terms and conditions 1236. The system may provide a preview of the offer as the merchant is creating the offer or after the offer is completed 1240. Alternatively, the merchant can create an offer based on past offers, such as by selecting duplicate button 1340 from an already sent offer listed in a view offers web page 1300 shown in FIG. 13.

Referring now to FIG. 13, an example view your offers web page 1300 is shown. In this example, the view your offers web page 1300 may provide system features grouped in components displayed vertically along the left hand side of the web page 1300 as competition 1302, reputation 1303, exposure 1304, communicate 1305 and get more customers 1306. The system provides view offers web page in response to a merchant selection of get more customers 1306 and then view your offers 1312 from web page 1300, or get customers button 1206 and then view active and past promotions 1212 from web page 1200.

In view your offers web page 1300, the system provides a listing of the merchant's offers. The system may allow the merchant to select which offers to view 1318 including as options, viewing all offers, current offers, expired offer, future offers. The system may also give the merchant the option to view the system's offer library for the merchant. When displaying the offers, each offer may have a text and/or icon indicating whether the offer is to be sent in the future 1328, is currently pending 1338 or has expired 1348. For each offer, the provider of the offer is listed by text and/or graphics and may include a logo, as shown by 1320, 1330 and 1340. Each listing includes text information about the offer 1324, 1334 and 1344, including the name of the offer, pertinent dates (start, stop, expiration) for the offer, how distributed (email, TWITTER, FACEBOOK post, traditional mail, third party websites), and to whom distributed (existing customers, prospective customers, recent customers, first time customers, all), etc. The system may provide buttons or other user interface items that allow the merchant to add notes 1326, 1336 and 1346 about the offer, edit the offer 1325 and track the performance of the offer 1335, 1345. In addition, the system may provide the merchant a text link, button or other user interface item to view the landing page 1322, 1332, 1342 for the offer. The landing page is a web page provided by the system to the consumer when the consumer clocks through on an offer link, scans a QR code or otherwise accesses the offer. The landing page may allow the consumer to print the offer, store the offer on the consumer's mobile telephone or mobile computing device, and provide other actions to the consumer including providing links or buttons for the user to like, follow, review the merchant on a third party website, or contact the merchant by email or view the system.

Merchant Offer Library

The merchant may access the merchant offer library by clicking on tab or text link or other user interface item such as manage your offer library 1214 and 1314 shown in FIGS. 12 and 13. The system provides the merchant with a relevant library of offers for different circumstances that relate to their business. The library is searchable and sortable by categories and types of offers such as (buy one get one, discounts, free trials, limited time offers/daily deals, etc.) Additionally, the system tracks which offers have been used, how many times, and when last used. The system allows for sorting on these measures. The system provides for viewing of the offers by usage metrics, such as number of clicks and click rate, redemption rate. The dynamic library of offers helps merchants to create more effective promotions, saving time and allowing merchants to learn which offers work best.

The library includes proprietary offers created specifically for different categories of merchants and different types of business as well as offers found online that are most popularly used by merchants in different categories of business. Each offer has associated meta data, including category and type of offer. The meta data also includes data that is updated with merchant usage data and consumer action data. The meta data makes the library searchable and sortable. The actual content of the offer is also keyword searchable using a text search.

The system aggregates and makes available a library of coupons, discounts and promotion offers sortable by category and type of offer along with related performance/meta data related to the use of the offer. This customized library is integrated directly into the process of developing consumer promotions/offers, and the system provides visibility to meta data related the use of the promotion/offer, such as when it was last used, the responses received, such as the number of times redeemed or other measurable success rate by the system. This saves the merchant time and allows them to provide more effective promotions then otherwise possible.

Location Based Offer Redemption Validation

The get customers component includes providing merchants the ability to send communications to customers that allow for location based offer redemption validation. When the merchant uses the get customers component to send offers or provide offers, consumers may view offers distributed via the system and other electronic techniques on their mobile device. The consumer may present the offers to merchants using their electronic devices or by printing offers and bringing them to a pint of sale. In one version of the system, when the mobile device is at the merchant location, an app associated with the system will reveal a way to redeem the offer. The redemption instructions or redemption trigger do not appear unless the device is identified as being located at the merchant location. This may be implemented in a cell phone or other mobile device app that is in communication with GPS, cell tower, WI-FI and other location determining systems. The system tracks the redemptions via wireless communications with a local device (merchant computer, POS, smart phone, etc.), email and/or backend reporting. The system provides merchants a more reliable way to verify that offers were present at the point of sale/redemption, which helps reduce redemption fraud.

The system uses devices that are able to provide GPS locational information (such as smartphones) to allow for the redemption of offers for the merchant, when the device is pinpointed as being at the coordinates of the merchant's location(s). When the offer is viewed on the device and the device is in the right location, the system pushes redemption instructions and/or a redemption trigger (slider, button) to the device, which when activated indicates to the system that the offer is being redeemed at the merchant location. This information is captured into the system. The redemption validation may be enhanced so that when the system receives the activation (clicking the redemption trigger button which only appears when the consumer is at the location), the system may push a code or receive an entered code, which may be captured/input at the point of sale to confirm the consumer is redeeming a valid offer and is present at the point of sale. This information is communicated to the merchant via Internet or wireless for tracking by the system. The system may notify the merchant immediately with a local device (merchant pc, POS, smart phone, email) or upon request via backend reporting.

The system provides locational validation of redemption, that is, verification that an offer is present at the point of sale and discount redemption. The system provides a competitive advantage to merchants concerned that electronically distributed offers may be counted against sales, when the offer is not present. The system allows a merchant to reduce or eliminate over-discounting by employees, and also similarly reduces or eliminates the ability of an employee to say an offer was present and pocket the discounted amount.

Strategic Rewards

The system provides merchants the ability to embed pre-defined offers that are trackable into communications on an ad hoc (e.g., part of a reply to a review within an unique customer email) or systematic basis (e.g., included within an online ad distributed across the Internet) and determine if any action was taken on or in response to the offer. This gives the merchant a controllable and trackable way to provide strategic offers to consumers electronically (and via traditional media, electronic or print). Through the system merchants can measure the effectiveness of these offers. The system provides merchants with information about when offers are clicked, downloaded/printed and redeemed, as well as whether it is a new or returning customers to the system. The system provides the merchant the ability to elect to make this part of how the merchant systematically grows their database of reachable customers (requiring consumer identification or otherwise identifying the consumer's electronic access). In this way, the system allows merchants to increase the information they have about their consumers and the reach they have with their direct marketing.

The system allows merchants to create pre-defined offers by using a system provided "offer wizard" and/or selecting from the merchant offer library. Once offers have been defined by a merchant using the system, the offers may be added as HTML code or other computer readable instructions within an email response or communication from the merchant to a customer through the system or a web post by the merchant to a third party website through the system. This process is automated by the system for emails, web posts, social media and other online posts, all of which are generated by the system. Merchants may manually copy the HTML code or other computer readable instructions and paste it into other communication systems for additional similar uses.

When an offer is generated via the system for automatic distribution by the system, the offer is uniquely identified and contains identifiers, such as, for example: the offer description; the offer distribution (an individual as is the case with a unique email or reply, or distributed as is the case when posted to a FACEBOOK or other third party web page); the date of distribution; the period the offer is valid for; number of valid offers if the offer is limited in quantity; and/or others.

When a merchant elects to use a system generated offer outside of the system, the system provides a user interface that allows the merchant to designate or select that the merchant will be promoting or using the offer outside of the system. The system may provide the merchant a form or text field, a selection of radio buttons, a menu of items or other user interface technique so that the merchant may identify the method of distribution, for example, company website, newspaper ad and alternative offer access techniques. In addition to providing the merchant the ability to manually copy HTML code or other instructions, the system may provide the merchant with a short URL or QR code to assist in providing the offer outside the system.

When a consumer clicks on a link to the offer, the consumer is linked to an offer landing page generated by the system. The consumer may also be directed to a mobile application or app within a third party website. For non-clickable distribution such as print ads or non-linkable websites the system provides a short URL, QR code or similar computer trackable item the consumer can copy/paste, type in or scan to link the consumer to an offer landing page generated by the system. When a consumer traverses one of these links, the system tracks and stores this fact as applicable to the consumer and the merchant. When a consumer visits a landing page, the system stores this fact as applicable to the consumer and the merchant.

If during the offer set up, the merchant specifies that the offer is available to everyone, multiple times during offer timeframe, do not require customer identification, or the offer is being individually communicated to a consumer within the system (so consumer ID is already know), then upon clicking the link the consumer is either presented the coupon directly for printing or the offer is immediately revealed/activated on a mobile app for use.

If during the offer set up, the merchant specifies individual identification is required (by selecting first-time customers only; or everyone for one time use; or everyone multiple use identification required), then upon clicking the embedded offer link, the consumer is prompted to enter their email address, or login with Facebook, enabling the coupon to be emailed to them or subsequently electronically revealed for use after the consumer identifies themself. In this fashion, anonymous offer distribution systematically identifies the user by their email address, FACEBOOK login ID, or other electronic identifier. If the system identifies the consumer via browser, IP address or evercookie, which is associated with either an email address or FACEBOOK follower ID, the identification requirement is bypassed and the offer is made immediately available as in the initial case. If the offer is one-time use and the consumer has been identified as having accessed the offer, the system presents a message to the consumer that the offer is no longer available.

The system tracks and reports online and offline coupon redemption, including providing a trackable link distributed online and/or via traditional media that tracks redemptions, identifying the users, including indicating whether the user is a new or existing customer. The system enables merchants to quickly and easily create trackable offers, for quick and ready deployment when, for example, replying to individual consumer/customer emails and third party website reviews. The system provides merchants a systematic way to provide incentives to consumers to provide their contact information to the merchant. The system provides merchants the ability to better evaluate their marketing by providing results for actual customer purchases and other customer actions. The system allows the merchant the ability to determine whether actions taken are from new or existing customers.

Promotion Results Modeler

When the merchant selects to create a new offer, the system provides a tool for merchants to model the potential results of a promotion or offer they are creating at the point of creation to help refine the offer and increase the likelihood of it providing the desired results.

The system provides the promotion results modeler at the point of offer creation within the offer wizard. The results are derived by the system from the terms of the merchant created offer or offer selected from the offer library. The results are also based in part on metrics provided by the system based on intelligence within the system, including: 1) the number of reachable consumers within the merchant's database or possible reachable merchants via the selected distribution channel or technology; 2) the average results from similar types of offers for other merchants (the metrics are anonymized as to the other businesses that data may be drawing from; 3) inputs requested directly from the merchant. These metrics may be changed by the merchant to allow for "what if" scenario analysis. These metrics may include: the number of offers redeemed, the average transaction dollar amount, the effective discount, the total cost of the distribution, the cost of goods/services provided via the promotion, the average return for the promotion investment, and others. The outcome is a projected average return for the promotion investment based on the assumptions used.

The system allows merchants to project the return on their offer or promotion at the point of creating it to help in their marketing planning. The system incorporates past results and known information for the merchant and the performance of similar offers from other merchants.

Information Capture

The system enables the collection of identifying information of a merchant's customers and prospects that access or access and use the merchant's promotional offers. This identifying information allows the system to easily send subsequent direct communications to the customer and/or track the customer's subsequent visits to the merchant, redemption of offers, and participation in transactions. The system allows merchants to identify a returning customer/prospect based on various identification methods. The system provides ongoing identification of customers/prospects and collects additional valuable information about customers from the promotional offers provided by the merchant using the system. The system then provides this additional information about the merchant's customer's to the merchant in raw form or processes it to provide analyses that are helpful in marketing. The system may use this information for direct re-marketing and marketing effectiveness tracking.

When a merchant promotes offers using any technique, from high tech online e-coupons available on a consumer's mobile device to post office delivered mailers, the system captures identifying information on the consumer when they electronically select or manually redeem the offer. This is done in any of the following ways: 1) by directing consumers that electronically select (via distributed trackable links) the offer to a system generated web page where the consumer enters their email and/or other identifying information (this identifying information may also be automatically determined using tools like FACEBOOK connect, browser cookies, FLASH cookies, and HTML 5 storage to identify a user and link them within the system's database) to get the offer redemption coupon emailed to them or made subsequently available on the web page (or other electronic display) for printing or electronic redemption; or 2) capturing the identifying information manually on specific customized forms that are adhered to the printed promotion (forms prompt for email, zip, name, purchase amount) or via a process of adding the customer information to the printed promotion and manually entering the data into the system; or 3) using point of sale data capture or mobile applications or other device to electronically read a code such as a QR code or UPC code to access the details of the offering being redeemed within the system and connect the user information, as it may be electronically available from the point of sale device, or manually added via the mobile scanning application or other reader device. After the identifying information is captured into the system, information for the transaction is: connected with the specific originating offer (and its associated details—distribution method/technology, date offered, originating electronic access of the web page) in the system for tracking purposes; added into the system so that the user/consumer may be identified within the system along with the communication/connections information captured (email, social media ID, cell phone ID, etc.); checked against the merchant's database of existing consumers (to identify the consumer/customer as new or returning for this offer—see Customer Loyalty Tracking below); added as a new reachable consumer within the merchant's database if the consumer is not already present (counted as a new customer for tracking purposes on this particular promotion/offer (see Customer Loyalty Tracking below); transaction information (amount spent in transaction) may be captured by and stored or entered into the system and associated with the offer and the consumer/customer.

When the consumer/customer does not redeem an electronically selected offer, the user may nonetheless be entered into the database as a prospect with identifying information added to the device they use to view the offer (e.g., cookie, etc.). This is valuable as the user may return to another offer via this device that they do redeem, all of which allows the merchant to learn more about users when they were still prospects and not yet an identified redeemed customer.

The system enables merchants in a single platform to electronically create offers which are automatically distributed electronically to many different channels (e.g., GOOGLE PLACES, FACEBOOK, PINTEREST, TWITTER, FOURSQUARE, YELP, and others) for electronic distribution or offline distribution (e.g., direct mail, newspaper, yellow pages, and others), which includes an embedded technique for capturing and associating end user information with the specific offer into the system and optionally adding transactional data (e.g., purchase amount, quantity, items, etc.). The system provides a platform for creating offers for multiple points of distribution, including online, with unique identification of distribution channels and techniques. The system provides the merchant a way to capture additional consumer identifying information to associate with the consumer. The capturing of additional consumer information enhances the ability of the merchant to communicate directly back to the consumer via the system or independent of the system. The system provides information on prospects in advance of redemption, including counts of consumers that have shown potential interest in offers that have not yet been redeemed.

Customer Loyalty Tracking

The system allows merchants to determine and measure consumer return visits to their business using offers or check-in technology. The system allows merchants to see if customers acquired via promotions return again and how frequently by tracking and storing this information. The system provides the ability for the merchant to determine the lifetime value of these customers and the effectiveness of various promotions they use. This integrates with the Cross Media ROI Analysis Tool and the Customer Information Capture feature.

When a customer uses a promotional offer from the merchant, the merchant collects the customer's email address, FACEBOOK contact, TWITTER name or other identifying information (via Customer Information Capture) into the system. The consumer's identifying information is associated with the offer used including the offer date, offer details, where and how the offer was distributed and any other information about the transaction that may optionally be collected, such as transaction amount and amount of effective discount. When the merchant distributes subsequent offers to the consumer via their associated contact information and the consumers uses an offer, with the identifying information being conveyed within the offer, the system tracks the subsequent offer redemptions and optionally any related transaction information. Additionally, if the consumers uses an offer that is distributed anonymously (e.g. direct mail, SEM, etc.), the Customer Information Capture feature may collect the identifying information for this consumer into the Customer Loyalty Tracking feature and thereby be able to connect the transaction with previous transactions from the same customer for loyalty tracking purposes. The Customer Loyalty Tracking feature provides reporting for every promotional offer monitored by the system as to the number of new customers and the number of recognized returning customers (previously identified within the system) and their respective aggregate spending and effective average discounts when this optional data is collected. Additionally, the system provides reports on promotion activity over a time period (system or merchant defined) to see among the new customers, how many have returned with other subsequent offers and when available, the average total transaction value. In this way the reports are no longer static, but are instead updating themselves overtime, with new data captured into the system. The system may provide reports that rank promotions over time by number of new customers, number of returning customers, number of new customers to this offer that have subsequently returned and their average total transaction value.

The system provides an automated method to evaluate and track if customers who use a merchant's various promotions are new or returning customers; update promotion results over time as offers are utilized and as information on users are updated within the system; rank and evaluate promotions/offers based on tracked results and unique associated metrics; and estimate and project customer value based on their promotion usage and frequency of visits.

Promotion Success Analysis

The system provides the merchant the ability to view metrics to compare their promotions to determine the financial and other returns for their investment in the cost of the promotion/advertising. This allows the merchant to clearly see which promotions provide the best values along with which distribution channels worked best, so the merchant can better decide subsequent advertising and promotional expenditures.

The system provides a list of offers 1318 the merchant has initiated tracking on through the system, such as that shown on web page 1300 in FIG. 13. The system receives selection of at least one of the offers from the offer list from the merchant. The system provides via a web page to the merchant return on investment (ROI) analysis generated by the system for the single selected offer or select multiple offers to view and compare the results. This may be achieved by the system providing a track performance button 1335, 1345 included with each already sent offer in the offer listing 1318 shown in FIG. 13. The system also provides the merchant the ability to compare results across channels of distribution and see the absolute return as well as the ROI of one versus the other. The system provides some or all the following details when providing ROI information to the merchant: offer name, offer start date, offer end date, offer description, offer terms, offer distribution channels, and offer results by distribution channel. The offer distribution channels are the techniques used to distribute the offer, such as, for example, email, FACEBOOK post, FACEBOOK targeted PPC, TWITTER post, GOOGLE+ post, GOOGLE PPC Keywords, GROUPON, MONEYMAILER, etc.

When the offer is distributed via the system, the information needed to compute the ROI analysis is automatically captured during the offer creation process and tracking within the system. When offers are distributed outside the system, such as, for example, via direct mail MONEYMAILER ad, newspaper ad, or GROUPON, the system may provide the merchant the ability to enter offer details into an online form provided by the system.

The offer results by distribution channel may include, where applicable, some or all of the following: [1] A distribution number may be the number of email offers delivered, the number views of a post on a third party website (such as, for example, FACEBOOK), the number of impressions of a GOOGLE pay-per-click keyword, the number of homes receiving a direct mail campaign item, etc. [2] A count of offer views/clicks may be the number of email offers that resulted in consumer's clicking through to the offer, the number of GOOGLE PPC keyword clicks. For some offers that used certain media like direct mail, there is no data on this metric. [3] The count of additional contact information captured such as new email addresses, receiving a FACEBOOK like, receiving a TWITTER follower, YELP ID, etc. The associated contact information is captured via the Customer Information Capture System described above. [4] The total count of offer redemptions. [5] The redemption rate may be computed as the count of redemptions divided by the count of offers viewed/clicked through. [6] The average transaction value (that is dollar amount) and number of transactions this data is collected for (e.g., there may be 50 redemptions of which 20 there was additional data collected on the total dollar amount of the transactions, which is averaged across the 20 it was collected on to arrive at an average transaction value. [7] The effective discount rate is used to calculate the true discount of the transaction including the additional dollars spent without a discount, e.g., offer discount is get $20 for $10, which is 50% discount, but if the average transaction value is $30, meaning the customers are spending $10 additionally at normal rates, then the effective discount rate is 33%, since $10 was paid for the offer and an additional $10 was paid at the point of sale, so $20 was paid for $30 of product/service delivered. [8] The total cost of the distribution. For some this is free, such as a post on FACEBOOK. For others it is variable (PPC multiplied by the number of clicks). In some circumstances it may be a fixed, known cost, such as, for example, the total cost of a mailing. [9] The count of total redemptions of offers by all customers. [10] The count of sub-total of redemptions by new customers. [11] The count of sub-total of redemptions by existing customers. [12] The awareness cost, namely the cost per views/click. [13] The customer acquisition cost. That is, the average cost per redemption for all customers. [14] The average transaction dollar amount for new customers. [15] The average transaction dollar amount (ATDA) for existing clients. [16] The cost per new contact information captured. [17] The immediate return per transaction. This extrapolates the ATDA across all transactions and subtracts the cost of the advertising and the marginal cost of the products/services provided divided by the number of transactions. [18] The ongoing or long-term return per transaction. And others.

The system allows the merchant to sort and rank the selected promotions by any of the criteria, as well as search by criteria to find promotions that match. In this fashion the system allows the merchant to compare results for different offers across distribution or advertising media.

The system captures of information from promotions/offers distributed across different channels/media. This allows the system to provide merchants the ability to compare the cost per customer acquired via promotions/offers distributed across different channels/media and also determine which of those customers are new or returning and related valuable associated data collected via the system. These system provided results allow the merchant to clearly see which promotions provide the best values along with which distribution channels worked best. In doing this, the system empowers merchants to better decide subsequent advertising and promotional expenditures.

Competitor Promotion Comparison

The system provides a merchant with metrics to compare their promotion results with those of other similar merchants, where the data of the other merchants has been anonymized to protect individual merchant information. The system allows the merchant to evaluate whether superior or inferior performance of a promotion with a particular distribution channel was unique to them or similar to what other merchants are experiencing. This information allows a merchant to evaluate which paid distribution channels to use based on the results of others.

To provide this information to merchants, the system aggregates results for all or a system defined number of relevant merchants and presents the results using graphics and text in a fashion that does not identify the underlying competing merchants. The relevant merchants may be determined by one or more of the goods or services provided, the category, the size of the merchant, and the location of the merchant. If there is not enough data at the level of granularity selected, the system may move up a level to where anonymity may be preserved. For example, if there are not enough Mexican restaurants, the system may move up from Mexican restaurants to results for all restaurants in the selected geography such as a county, or the system may move up from Mexican restaurants in the selected geography such as a county to results for Mexican restaurants in a greater geography such as an entire state. The system may provide results as a range or other non-specific metric or ranking such as Low, Medium, High; on a graded scale such as A, B, C; on a numerical scale from 1 to 5; and others.

The system may combine information for new channels, including CPC, daily deals, email capture apps, mobile offers, and others. The data from the system is also used within the promotion results modeler, described above, in analysis that allows for predicting the results of campaigns the merchant may be contemplating.

UNDERLYING FEATURES

A. Scoring

The system computes and provides various scores to merchants. The score predominately displayed on the main web page 400 is the overall marketing score 408. The overall marketing score is also provided other web pages in the system and is used throughout the system. The overall marketing score allows a merchant to track online marketing effectiveness. The system provides web pages that show a merchant's standing—use of and performance on multiple online media—against competitors. The system provides merchants the ability to use the overall marketing score to measure performance and success across time and see the impact of marketing efforts they are implementing via changes in the overall marketing score.

The overall marketing score consists of four or more component categories. The categories identify specific focus areas for the merchant. The system may use these focus areas to recommend that the merchant take specific actions to take to increase their overall marketing score. Similarly the online scores may identify where the merchant succeeding and not meeting system recommended or merchant specified goals. The system may provide the merchant a chart or graph of their overall marketing score over time, and may show their overall marketing score relative to industry averages and/or relative to competition. The competition may be merchant selected or system selected competitors of the merchant, or a combination of the two.

Online scores are based on data collected for the merchant's business within different component categories. The categories and category components may be amended, that is, added to and/or subtracted from, from time to time by the system as needed to reflect marketing effectiveness. The categories include, for example: exposure or visibility, reputation, promotions, and consumer interaction and communications. These categories are described in more detail below.

A proprietary algorithm is applied to the data collected in the categories to derive a single overall marketing score for the merchant. There may be several additional scores for the merchant dependent on the data used to calculate the score. A public online score may be calculated using publically available data. A private online score may be calculated in whole or in part using data that is not publicly available. The algorithm used to calculate the scores may roll up to a category score for benchmarking purposes and also roll up for groups of businesses, such as franchise locations. The categories of data used in the scoring algorithm that computes the online score are described in the following paragraphs.

The exposure category includes information that the system finds and collects on the merchant by crawling well known third party websites on the Internet. The exposure category may include, for example: whether the business is listed by popular search engines (e.g., GOOGLE, BING, YAHOO), in directory websites (e.g., YELLOW PAGES), review websites (e.g., YELP), social media websites (e.g., FACEBOOK, TWITTER, PINTEREST) and other consumer facing websites. The exposure category data may also include the category or categories the business is listed under on third party websites. The exposure category may include, for example, whether the business has claimed third party website listings (e.g., on FACEBOOK, YELP, etc.) and enhanced the listings with photos, video, offers, additional categories, additional business description information. The exposure category may include, for example, information about whether information about the merchant (including name, address, phone number, hours, website name, email address, etc.) is consistent between third party websites; whether the information about the merchant is accurate on third party websites. The exposure category may include information that the merchant does not appear on well-known or popular third party websites or social media. The exposure category may include, for example, the number of times links to the merchant appear in relevant search results. The exposure category may also take into consideration whether the merchant's main website includes certain features such as online ordering, user comments, and other features.

The reputation category includes information that the system finds and collects on the merchant and, optionally, other merchants. The reputation category may include, for example: the total number of reviews and ratings for the merchant on selected third party rating and review websites; the review and rating score for each review found and, where there is not a score, the implied rating derived when possible from keywords within the review; the average rating of all reviews on a website; the date of each review of the merchant; and the freshness of the reviews and ratings as determined by the number of reviews written in a recent time period (such as for example, past week, past month, past quarter). The reputation category may include, for example, a clout score or clout measurement reflecting the clout of the reviews based on the number of friends that the reviewer is connected to on social networking websites. The reputation category may include, for example, a numerical or other ranking of where reviews of the merchant appear in initial order as displayed on review website webpages. The reputation category may include, for example, information about whether reviews appear on other third party websites, not just the most popular or most well-known third party websites.

The promotion category includes information about promotions and other marketing the system finds on and collects from third party websites (such as, for example, YELP, GOOGLE, GROUPON.COM, MONEYMAILER.COM, VALPAK.COM, and others), the merchant's website and, in some embodiments, from the merchant's physical business location (also for the merchant's competitors). The promotion category may include, for example, one or more of, the number of promotional offers promoted by the merchant on the merchant's website, the number of offers available on third party websites, and the number of offers available by traditional printed promotions including, for example, mailers and ads in newspapers and other publications. The promotions may include linked offers from the merchant website, email offers, tweeted offers, search engine marketing (SEM) ads, print promotions, and QR codes that direct a customer to a web page the system creates, serves and monitors. As the system assists the merchant in marketing and other promotions, including creating a web page for distribution of offers created in the system and the tracking of various kinds of offer (described herein), the promotion category may include the number of promotions sold, printed or indicated as selected or used on the system as well as a the distribution value associated with the merchant's offers based on the expected exposure where the expected exposure is the anticipated number of customer's taking advantage of the offer. The system may also evaluate the value and appeal of the offer relative to offers by competitors of the merchant and factor that into the promotion category.

The consumer interaction and communications category may include information the system finds and collects on the merchant's email to customers and posting responses to reviews at third party websites and via social media providers. The consumer interaction and communications category may include, for example, the number of consumers who indicate interaction with the merchant such as with check-ins, followers, likes, posts and the trend of the these indicators. The system may obtain this information from third party websites and social media providers such as, for example, TWITTER, FACEBOOK, FOURSQUARE and GOOGLE PLUS, by searching for the merchant on third party social networking websites. The consumer interaction and communications category may include in its calculations, the volume of and freshness of comments on and replies regarding the merchant on third party social media websites, and may also take into consideration the number of and freshness of communications found that originate from the merchant to consumers as captured from third party social networking websites.

Several scores may be derived from the categories of data collected including a public score and a private score. These scores may be computed using information collected and analyzed in categories such as the exposure, reputation, promotions, and consumer interaction and communications categories described above. The public score is based upon publicly available information collected by the system; and the private score may be based upon the same information used to create the public score data as well as information not available publicly. The information not available publicly may be known to or available to the system, and may be calculated by the system and/or resulting from use of the system by merchants, such as, for example, the number of unique email addresses in the system, the percentage of coupons redeemed via the system, the percentage of coupons from new versus existing customers, average cost of customer acquisition, etc. The system provides the private score to allow merchants to track their progress across time as the private score factors in information and actions the merchant takes that are not publicly available, but that are included, monitored and tracked within the system.

The overall marketing score scored provided by the system includes data found online, that exists without merchant involvement, as well as without online information/marketing data that a merchant implements and related meta data captured by the system. The system provides significant competitive advantages to the merchants who have access to their overall marketing score. The overall marketing score allows merchants to readily and easily compare their overall marketing score with other merchants. The additional other available scores provided by the system allows the merchant to evaluate how the merchant compares to other merchants in a same or nearby geographical area offering the same or similar products or services The overall marketing score can be used as well for comparisons to other merchants in a nearby geographical location. The system provides other scores that allow merchants to compare their performance on a particular area of marketing focus. Additionally, the system uses the various scores for internal tracking of merchant progress and display of that progress to the merchant by way of comparison graphs, comparison charts, side-by-side graphics and tables, and the like. The system provided overall marketing score derived from a measure of the factors that impact consumer decision making on whether or not to patronize a business, as reflected in the above described categories, is a great benefit to merchants as it provides merchants an holistic view of the many different factors that impact the success of a merchant.

The system also uses the online score and its constituent component categories of information and measurements to identify clues and/or triggers to specific actions the merchant may and/or should take to improve their marketing activities. Also, when used by franchisors or owners of groups of individual merchant locations, the system provided combination of an individual location score, a competitive benchmark score (that is, a roll-up score for merchants in a related industry and/or geography) and the roll-up of all owned/franchise locations may provide a valuable tool that allows the merchant to manage factors that impact attracting customers and increase profitability.

B. Recommendation Engine

Throughout all of the web pages described herein, various recommendations are provided to the merchant. A recommendation engine included in the system provides these recommendations. The recommendation engine provides business recommendations in the form of a marketing plan comprised of recommended actions that are customized for the individual merchant based on information collected on the merchant, including data included in the category components of their overall marketing score (described above) as well as actions taken and not taken within the system by the merchant. The recommendation engine identifies recommended actions the merchant should take. The system prioritizes the recommended actions based on the calculated value or impact implementing the particular recommended action will have for the merchant as determined by the online score and/or the merchants previously stated business priorities. The system assists the merchant in determining which recommended action to do next to help increase the effectiveness of their marketing and ultimately the success of their business by providing the recommended actions in a prioritized format.

Collectively the system provides a marketing plan comprised of recommended actions presented as a clear and easy to follow step by step program that is a comprehensive, customized integrated marketing plan. The marketing plan is timely and fresh since the system regularly and/or constantly updates the recommended actions included in the marketing plan based on actions the merchant takes and additional information collected by the system on the merchant and the merchant's competitors. This can be seen by review of the home area 410 on the main web page 400 shown in FIG. 4 in the form of recommendations 412 and the specific now, next and then recommendations 414, 417 and 418. The recommended actions the system provides the merchant include instructions on how to complete the actions. The instructions may include how-to videos; an explanation of why the action is of value; input/feedback from other merchants who have viewed the recommendation; and a link the merchant clicks on to start the recommended action. The links may lead the merchant though answering questions and/or inputting data which the system uses to execute the recommended action for the merchant.

The recommendation engine is an intelligent database populated with actions and related instructions. The actions are based on the component categories that make up the online score. The actions may be ranked for priority. The priority may be driven or required by a preliminary step needed before other actions are taken, such as a set-up or view action step, and whether the action has been taken or not. The system may prioritize actions or sequences of actions based on the relative importance of each set of actions as evaluated by the system. The system may evaluate the relative import of an action based on the impact the particular action has on the online score and/or requirements or goals specified by the merchant into the system. Upon the merchant taking an action, the system may immediately update the marketing plan for the merchant. However the impact may not be immediately reflected in the online score for the merchant.

The marketing plan including recommended actions may be communicated by the system to the merchant in one or more ways, including, for example, text windows or frames on a web page, alert boxes that include textual information, sound alerts, and links to additional information within the system, as well as via other electronic communication methods including text messaging and emailing, and system marketing alerts.

Important to the recommendation engine is that the recommended actions include actions across multiple external third party websites. Important to the recommendation engine is that the recommended actions instruct the merchants on recommended actions at one or more external third party websites. For some of the recommended actions, the system provides an automation of the actions recommended, and for others the system provides the merchant a link or other tie to an external third party website such that the system provides the merchant the capability to fulfill the recommended action at external third party websites.

C. Verified Closed Social Network

The system provides the capability for merchants to connect with other merchants online to share a) ideas, experiences and potential proprietary information and b) facilitate co-marketing opportunities of fair value. The system determines that the merchant's identification has been verified so that participating merchants knows they are really networking with the owner/operator of other businesses.

Once identified, the merchant may use the standard social networking features such as exposing more profile information to "linked" merchants and sharing ideas and answering questions for each other. The system enables merchants to contact and communicate with merchants having similar challenges without fear they are talking with competitors. Merchants may use the system to develop co-marketing opportunities that will be mutually beneficial. Some of the features include the following, for example. The system may set terms and conditions for participating merchants to legally bind confidentiality and intended use of shared information and data. The system may provide defined levels of data, information and access the merchant agrees to share with other verified merchants within system. Example pre-defined levels are: Level 1—contact information, type of co-marketing deals of interest, questions and answers displayed may be shared; Level 2—campaign results data may be shared; and Level 3—profile card with data on reachable consumers (e.g., number of consumers, communications methods used, average recent email statistics, delivery numbers, opens, click-throughs)

The system may provide merchants a merchant matching processing feature to match merchants for co-marketing. A merchant may search other relevant merchants (proximity, merchants that are not excluded based on being a competitor) to see a limited level of information (system or merchant set level) and request co-marketing opportunities. The system may facilitate creation of marketing message/offer and delivery to combined agreed database of each participating merchants' reachable consumers without disclosing contact info to the other merchant. The system may verify combined campaign numbers for delivery, email opens, link click-throughs, and the like; and the system may provide each with a way to get their respective click-thru and offer usage stats.

Merchants that have claimed selected phone verification websites for their business and are paying customers of the service are offered to participate. Participating merchant data is aggregated from within the system and exposed to other participating merchants within the system based on certain business rules. Level 1 info is exposed to all participating merchants. The system selectively reveals Level 2 and Level 3 info of the merchant to other merchants. The system provides the capability for merchants to search for other merchants to request to share level 2 and level 3 access and then invite them to share. Upon accepting a share invitation, each merchant may see the others shared data. The system allows merchants to search for other merchants to share with based on category, geography and pre-set buckets of data, e.g. <500 reachable consumers, 501-3000, 3001-10,000, 10,000+. When merchants agree to combine their reachable consumers, the system performs this in a limited way to restrict merchants from seeing the contact information such that the information is provided through the system as part of the agreed upon promotion. Using the system offer creation wizard, the system provides participating merchants another option available for distribution, which represents the combined distribution options agreed upon. The rest of the offer creation wizard works the same as single merchant offer creation. The system merges the offers as appropriate by distribution technique (email) or posts them individually as appropriate (FACEBOOK, TWITTER, etc.) for the combined agreed upon distribution of the participating merchants. Since the links within the promotion are generated within the system, tracking is provided to each participating merchant for only their portion of the promotion as appropriate.

The system allows merchants to connect and combine their database of reachable consumers for mutual promotion with other merchants, while maintaining confidentiality of the consumers' contact information. The system also provides customized reporting of the effectiveness of the offer. The verified network provided by the system enables local merchants to work together to benefit from the relationships they have built with their customers and use that to reach new customers from like-minded and complementary merchants.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method comprising:
   as implemented by one or more computing devices configured with specific executable instructions,
   crawling a plurality of third party websites and social media providers to obtain information about a plurality of merchants, including basic information and enhanced information;
   correlating the information from the plurality of third party web sites and social media providers for the plurality of merchants based on merchant names, merchant phone numbers and merchant addresses;
   creating a merchant database based on the results of the crawling;
   providing a web page allowing a new merchant to create an account;
   receiving a request from the new merchant to create an account;
   receiving account creation information from the new merchant;
   linking the new merchant to an existing merchant entry in the merchant database based on the account creation information;
   creating an account for the new merchant as a subscribing merchant including updating the merchant database for the subscribing merchant based on the account creation information and the linking;
   monitoring the third party websites and social media providers for information regarding the subscribing merchant and the plurality of merchants;
   storing in the merchant database information regarding the subscribing merchant and the plurality of merchants found during the monitoring;
   providing an alert to the subscribing merchant based on the monitoring when an alert trigger is identified;
   providing a main web page allowing the subscribing merchant to select from a plurality of components including at least three of a competition component, a reviews component, a visibility component, a get customers component, and a communications component;
   receiving a selection of one of the plurality of components by the subscribing merchant;
   preparing an overall marketing score for the subscribing merchant based on the subscribing merchant accessing each of the plurality of the components, a number of appearances of the merchant on third party sites with consistent information, a number of reviews for the subscribing merchant on third party websites, a number of mentions in social media, and a number of offers promoted by the subscribing merchant; and displaying the overall marketing score on the main web page.

2. The method of claim 1 wherein the basic information includes a name and address for the subscribing merchant, and the enhanced information includes at least one of prices or price ranges for goods and services, photos or videos posted by or about the subscribing merchant, email addresses, social media accounts, hours of operation, payment types accepted, Wi-Fi availability, and reviews regarding the subscribing merchant.

3. The method of claim 1 wherein the alerting is provided to the subscribing merchant by one of text message and email.

4. The method of claim 1 wherein the marketing alert is provided to the subscribing merchant on an app on the subscribing merchant's mobile telephone or mobile computing device.

5. The method of claim 1 wherein the alert includes the information regarding the subscribing merchant found during the monitoring.

6. The method of claim 5 wherein the alert further includes a link to either a reviews web page or a communications web page that provides suggested actions for the subscribing merchant to take.

7. The method of claim 1 wherein the alert trigger is one selected from the group including: incorrect subscribing merchant information on one of the third party websites, inconsistent subscribing merchant information between two or more third party websites, when a review of the subscribing merchant is posted on one of the third party websites, when the subscribing merchant is mentioned on one of the third party websites or social media stream.

8. The method of claim 1 wherein the monitoring includes analyzing reviews on third party websites that mention the subscribing merchant.

9. The method of claim 1 wherein the monitoring includes analyzing listings on third party websites that mention the subscribing merchant.

10. The method of claim 1 wherein the monitoring includes analyzing social media feeds for references to the subscribing merchant.

11. The method of claim 1 wherein receiving the selection includes receiving a subscribing merchant selection of the visibility component and the method further comprises:
providing a web page listing third party website account information for the subscribing merchant including indications of claimed accounts, conflicting data, duplicate listings and missing accounts.

12. The method of claim 11 wherein the providing a web page listing third party website account information for the subscribing merchant comprises providing a user interface allowing the subscribing merchant to update the merchant information on multiple third party website at one time without having to directly login to the third party websites.

13. The method of claim 1 wherein receiving the selection includes receiving a subscribing merchant selection of the competition component and the method further comprises:
providing a web page allowing the subscribing merchant to select at least one competing merchant from a plurality of competing merchants;
receiving a subscribing merchant selection of the competing merchants;
displaying text and graphics showing how the subscribing merchant compares to the competing merchants in marketing score, number of reviews, average review rating, listings on third party websites, mentions on social media, and number of marketing offers.

14. The method of claim 13 wherein the web page provides a map showing the subscribing merchant and the plurality of competing merchants.

15. The method of claim 13 further comprising:
providing a list of competing merchants that are within a system defined geographical area close to the subscribing merchant, share a category of business with the subscribing merchant.

16. The method of claim 13 further comprising:
providing a user interface allowing the subscribing merchant to limit the list of competing merchants based on a geographical area and a category of business.

17. The method of claim 1 wherein receiving the merchant selection includes receiving a merchant selection of the reviews component and the method further comprises:
providing a web page listing a plurality of third party website reviews for the subscribing merchant, the listing including for each review a third party website name and logo, a posting date, a reviewer ID.

18. The method of claim 17 wherein the web page listing the plurality of third party website reviews further comprises a user interface item for each review allowing the subscribing merchant to reply to the review on the third party website without having to directly login to the third party website.

19. The method of claim 17 further comprising:
evaluating whether review IDs associated with reviews on third party websites are associated with customers known to have patronized the subscribing merchant;
designating those review IDs associated with reviews on third party websites associated with customers known to have patronized the subscribing merchant as verified reviewers.

20. The method of claim 19 wherein the web page listing the plurality of third party website reviews further comprises an indication for each reviewer ID of whether the reviewer ID is for a verified reviewer.

21. The method of claim 1 wherein receiving the merchant selection includes receiving a merchant selection of the get customers component and the method further comprises:
providing a web page allowing the subscribing merchant to select from creating an offer campaign, viewing active and past promotion, and manage an offer library.

22. The method of claim 21 further comprising:
in response to receiving a subscribing merchant selection to create an offer campaign, providing a user interface guiding the subscribing merchant with text and graphical prompts to complete a suggested offer including template offer information.

23. The method of claim 22 further comprising:
receiving subscribing merchant specification for an offer;
preparing the offer based on the subscribing merchant offer specification, the offer including a trackable link;
receiving a subscribing merchant command to send the offer;
transmitting the offer on a subscribing merchant specified communication media.

24. The method of claim 23 wherein the trackable link is a link to a monitored offer web page.

25. The method of claim 24 further comprising:
tracking consumer activity regarding the offer based on the trackable link.

26. The method of claim 1 wherein receiving the merchant selection includes receiving a merchant selection of the communications component and the method further comprises:

providing a web page allowing the subscribing merchant to select from creating and sending messages to consumers, viewing sent and scheduled messages, and managing a contacts library.

27. The method of claim 26 further comprising:
in response to receiving a subscribing merchant selection to create and send messages to one or more consumers, enabling the subscribing merchant to send a message to one or more consumers via email, social media, and third party website from a single location without the subscribing merchant having to externally login and visit a third party website, email providers and social media providers, including providing message templates to the subscribing merchant.

28. The method of claim 27 further comprising:
receiving subscribing merchant specification for a message;
preparing the message based on the subscribing merchant message specification, the message including a trackable link;
receiving a subscribing merchant command to send the message;
transmitting the message on a subscribing merchant specified communication media.

29. The method of claim 28 wherein the trackable link allows for tracking the receiving consumer accessing the message.

30. A system comprising:
a merchant database configured to store information associated with one or more merchants; and
a computing system comprising one or more hardware computing devices, said computing system in communication with the merchant database and configured to:
crawl a plurality of third party websites and social media providers to obtain information about a plurality of merchants, including basic information and enhanced information;
correlate the information from the plurality of third party web sites and social media providers for the plurality of merchants based on merchant names, merchant phone numbers and merchant addresses;
store information associated with the plurality of merchants in the merchant database based on the results of the crawling;
provide a web page allowing a new merchant to create an account;
receive a request from the new merchant to create an account;
receive account creation information from the new merchant;
link the new merchant to an existing merchant entry in the merchant database based on the account creation information;
create an account for the new merchant as a subscribing merchant including updating the merchant database for the subscribing merchant based on the account creation information and the linking;
monitor the third party websites and social media providers for information regarding the subscribing merchant and the plurality of merchants;
store in the merchant database information regarding the subscribing merchant and the plurality of merchants found during the monitoring;
provide an alert to the subscribing merchant based on the monitoring when an alert trigger is identified;
provide a main web page allowing the subscribing merchant to select from a plurality of components including at least three of a competition component, a reviews component, a visibility component, a get customers component, and a communications component;
receive a selection of one of the plurality of components by the subscribing merchant;
determine an overall marketing score for the subscribing merchant based on the subscribing merchant accessing each of the plurality of the components, a number of appearances of the merchant on third party sites with consistent information, a number of reviews for the subscribing merchant on third party websites, a number of mentions in social media, and a number of offers promoted by the subscribing merchant; and
present the overall marketing score for display on the main web page.

31. The system of claim 30, wherein the basic information includes a name and address for the subscribing merchant, and the enhanced information includes at least one of prices or price ranges for goods and services, photos or videos posted by or about the subscribing merchant, email addresses, social media accounts, hours of operation, payment types accepted, Wi-Fi availability, and reviews regarding the subscribing merchant.

32. The system of claim 30, wherein the alerting is provided to the subscribing merchant by one of text message and email.

33. The system of claim 30, wherein the marketing alert is provided to the subscribing merchant on an app on the subscribing merchant's mobile telephone or mobile computing device.

34. The system of claim 30, wherein the alert includes the information regarding the subscribing merchant found during the monitoring.

35. The system of claim 34, wherein the alert further includes a link to either a reviews web page or a communications web page that provides suggested actions for the subscribing merchant to take.

36. The system of claim 30, wherein the alert trigger is one selected from the group including: incorrect subscribing merchant information on one of the third party websites, inconsistent subscribing merchant information between two or more third party websites, when a review of the subscribing merchant is posted on one of the third party websites, when the subscribing merchant is mentioned on one of the third party websites or social media stream.

37. The system of claim 30, wherein the monitoring includes analyzing reviews on third party websites that mention the subscribing merchant.

38. The system of claim 30, wherein the monitoring includes analyzing listings on third party websites that mention the subscribing merchant.

39. The system of claim 30, wherein the monitoring includes analyzing social media feeds for references to the subscribing merchant.

40. The system of claim 30, wherein receiving the selection includes receiving a subscribing merchant selection of the visibility component and the computing system is further configured to:
provide a web page listing third party website account information for the subscribing merchant including indications of claimed accounts, conflicting data, duplicate listings and missing accounts.

41. The system of claim 40, wherein the providing a web page listing third party website account information for the subscribing merchant comprises providing a user interface allowing the subscribing merchant to update the merchant information on multiple third party website at one time without having to directly login to the third party websites.

42. The system of claim 30, wherein receiving the selection includes receiving a subscribing merchant selection of the competition component, and wherein the computing system is further configured to:
provide a web page allowing the subscribing merchant to select at least one competing merchant from a plurality of competing merchants;
receive a subscribing merchant selection of the competing merchants;
present for display text and graphics showing how the subscribing merchant compares to the competing merchants in marketing score, number of reviews, average review rating, listings on third party websites, mentions on social media, and number of marketing offers.

43. The system of claim 42, wherein the web page provides a map showing the subscribing merchant and the plurality of competing merchants.

44. The system of claim 42, wherein the computing system is further configured to:
provide a list of competing merchants that are within a system defined geographical area close to the subscribing merchant and that share a category of business with the subscribing merchant.

45. The system of claim 42, wherein the computing system is further configured to:
provide a user interface allowing the subscribing merchant to limit the list of competing merchants based on a geographical area and a category of business.

46. The system of claim 30, wherein receiving the merchant selection includes receiving a merchant selection of the reviews component, wherein the computing system is further configured to:
provide a web page listing a plurality of third party website reviews for the subscribing merchant, the listing including for each review a third party website name and logo, a posting date, and a reviewer ID.

47. The system of claim 46, wherein the web page listing the plurality of third party website reviews further comprises a user interface item for each review allowing the subscribing merchant to reply to the review on the third party website without having to directly login to the third party website.

48. The system of claim 46, wherein the computing system is further configured to:
determine whether review IDs associated with reviews on third party websites are associated with customers known to have patronized the subscribing merchant; and
designate those review IDs associated with reviews on third party websites associated with customers known to have patronized the subscribing merchant as verified reviewers.

49. The system of claim 48, wherein the web page listing the plurality of third party website reviews further comprises an indication for each reviewer ID of whether the reviewer ID is for a verified reviewer.

50. The system of claim 30, wherein receiving the merchant selection includes receiving a merchant selection of the get customers component wherein the computing system is further configured to:
provide a web page allowing the subscribing merchant to select from creating an offer campaign, viewing active and past promotion, and manage an offer library.

51. The system of claim 50, wherein the computing system is further configured to:
in response to receiving a subscribing merchant selection to create an offer campaign, provide a user interface guiding the subscribing merchant with text and graphical prompts to complete a suggested offer including template offer information.

52. The system of claim 51, wherein the computing system is further configured to:
receive subscribing merchant specification for an offer;
prepare the offer based on the subscribing merchant offer specification, the offer including a trackable link;
receive a subscribing merchant command to send the offer; and
send the offer on a subscribing merchant specified communication media.

53. The system of claim 52, wherein the trackable link is a link to a monitored offer web page.

54. The system of claim 53, wherein the computing system is further configured to:
track consumer activity regarding the offer based on the trackable link.

55. The system of claim 30, wherein receiving the merchant selection includes receiving a merchant selection of the communications component and the computing system is further configured to:
provide a web page allowing the subscribing merchant to select from creating and sending messages to consumers, viewing sent and scheduled messages, and managing a contacts library.

56. The system of claim 55, wherein the computing system is further configured to:
in response to receiving a subscribing merchant selection to create and send messages to one or more consumers, enable the subscribing merchant to send a message to one or more consumers via email, social media, and third party website from a single location without the subscribing merchant having to externally login and visit a third party website, email providers and social media providers, including providing message templates to the subscribing merchant.

57. The system of claim 56, wherein the computing system is further configured to:
receive subscribing merchant specification for a message;
prepare the message based on the subscribing merchant message specification, the message including a trackable link;
receive a subscribing merchant command to send the message; and
send the message on a subscribing merchant specified communication media.

58. The system of claim 57, wherein the trackable link allows for tracking the receiving consumer accessing the message.

* * * * *